United States Patent
Bohr et al.

(10) Patent No.: US 7,493,826 B2
(45) Date of Patent: *Feb. 24, 2009

(54) VELOCITY FEEDBACK COMPENSATION FOR FORCE CONTROL SYSTEMS

(75) Inventors: Gerard V. Bohr, Fountain Valley, CA (US); Norman J. Englund, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/801,059

(22) Filed: May 7, 2007

(65) Prior Publication Data

US 2007/0209445 A1    Sep. 13, 2007

Related U.S. Application Data

(63) Continuation-in-part of application No. 11/221,006, filed on Sep. 7, 2005, now Pat. No. 7,281,431.

(51) Int. Cl.
G01L 1/00    (2006.01)
(52) U.S. Cl. .................................... 73/774
(58) Field of Classification Search ............ 73/774, 73/840; 700/245, 44
See application file for complete search history.

(56) References Cited

U.S. PATENT DOCUMENTS

| | | | |
|---|---|---|---|
| 4,094,188 A | 6/1978 | Bellouin et al. ................ | 73/81 |
| 4,336,745 A | 6/1982 | Lund | |
| 4,537,077 A | 8/1985 | Clark | |
| 4,679,591 A | 7/1987 | Maue | |
| 5,285,715 A | 2/1994 | Elrod, Jr. | |
| 6,286,644 B1 | 9/2001 | Wakui ....................... | 188/378 |
| 6,463,357 B1 | 10/2002 | An et al. ..................... | 700/245 |
| 6,470,225 B1 | 10/2002 | Yutkowitz ................... | 700/44 |
| 7,281,431 B2 * | 10/2007 | Englund et al. .............. | 73/774 |

FOREIGN PATENT DOCUMENTS

| | | |
|---|---|---|
| EP | 0816141 A1 | 1/1998 |
| EP | 0897111 A2 | 2/1999 |
| JP | 2004050321 A | 2/2004 |

OTHER PUBLICATIONS

Zhao et al., "Considerations for the development of real-time dynamic testing using servo-hydraulic actuation", Earthquake Engineering and Structural Dynamics, 2003, pp. 1773-1794, XP002417566.

Yu et al., "Force-vibration testing of buildings using the linear shaker seismic simulation (LSSS) testing method", 13th World Conference on Earthquake Engineering, No. 2206, 2004, XP002417567.

* cited by examiner

*Primary Examiner*—Jewel Thompson
(74) *Attorney, Agent, or Firm*—Ostrager Chong Flaherty & Broitman P.C.

(57) ABSTRACT

A method for reducing force and position control tracking errors caused by changes in hydraulic pressure at the actuator ports of a hydraulic servo valve. The method may use either the force command signal or the load cell signal in conjunction with a mathematical algorithm to compensate for changes in the flow capacity in the servo valve caused by changes in pressure at its ports. Good performance can be attained using the load cell signal. Alternatively, the algorithm can use the force command signal. The performance of the control loop with proper velocity feed-forward compensation keeps the feedback signal largely in phase with the command. Pressure sensors for detecting pressure changes at the actuator ports of the servo valve are not required for load droop compensation.

20 Claims, 13 Drawing Sheets

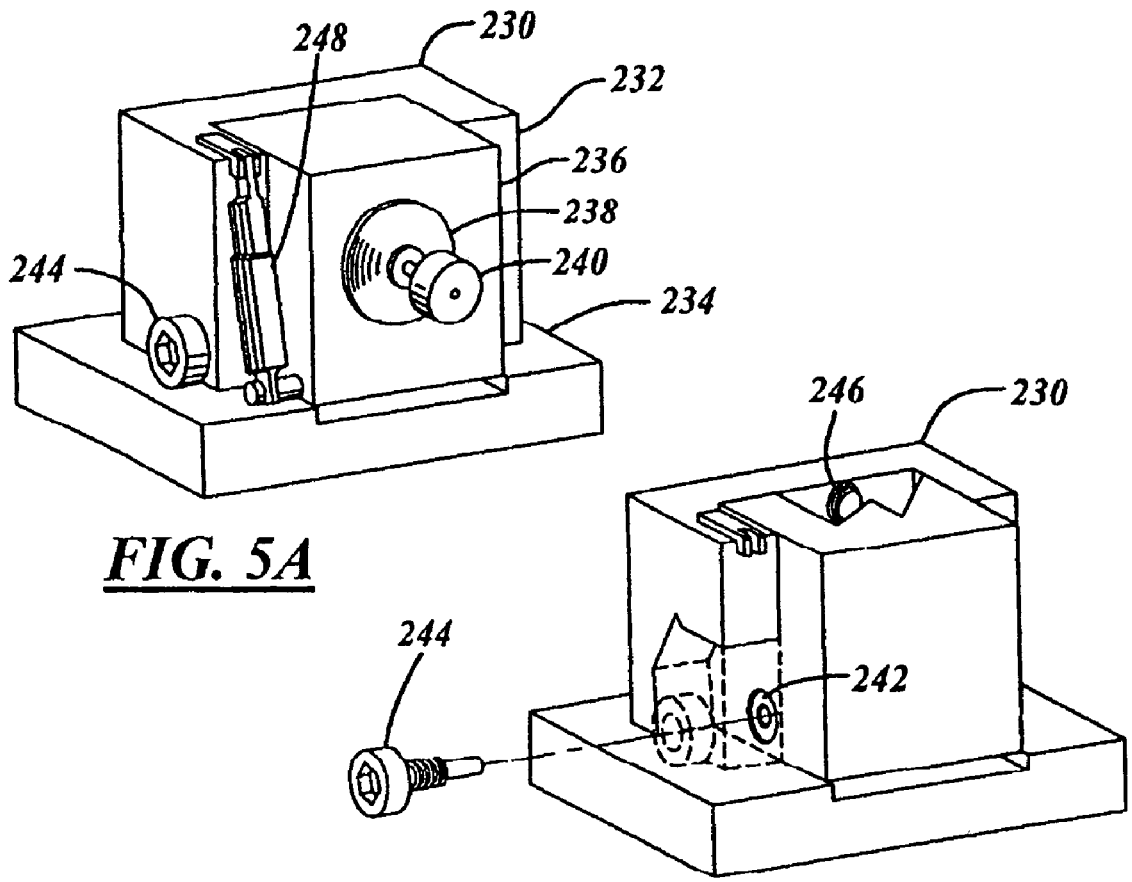
*FIG. 5A*
*FIG. 5B*
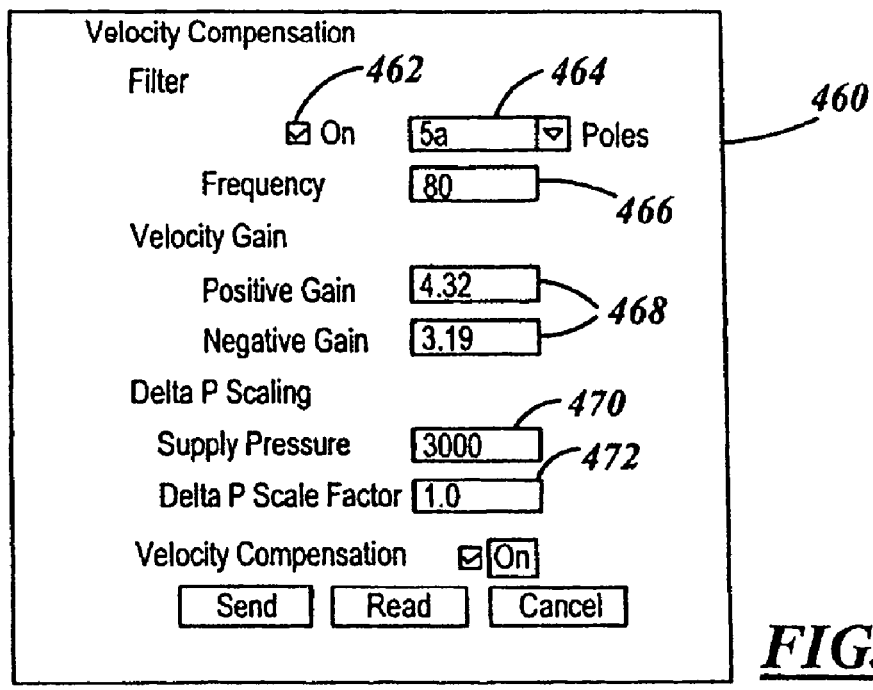
*FIG. 13*

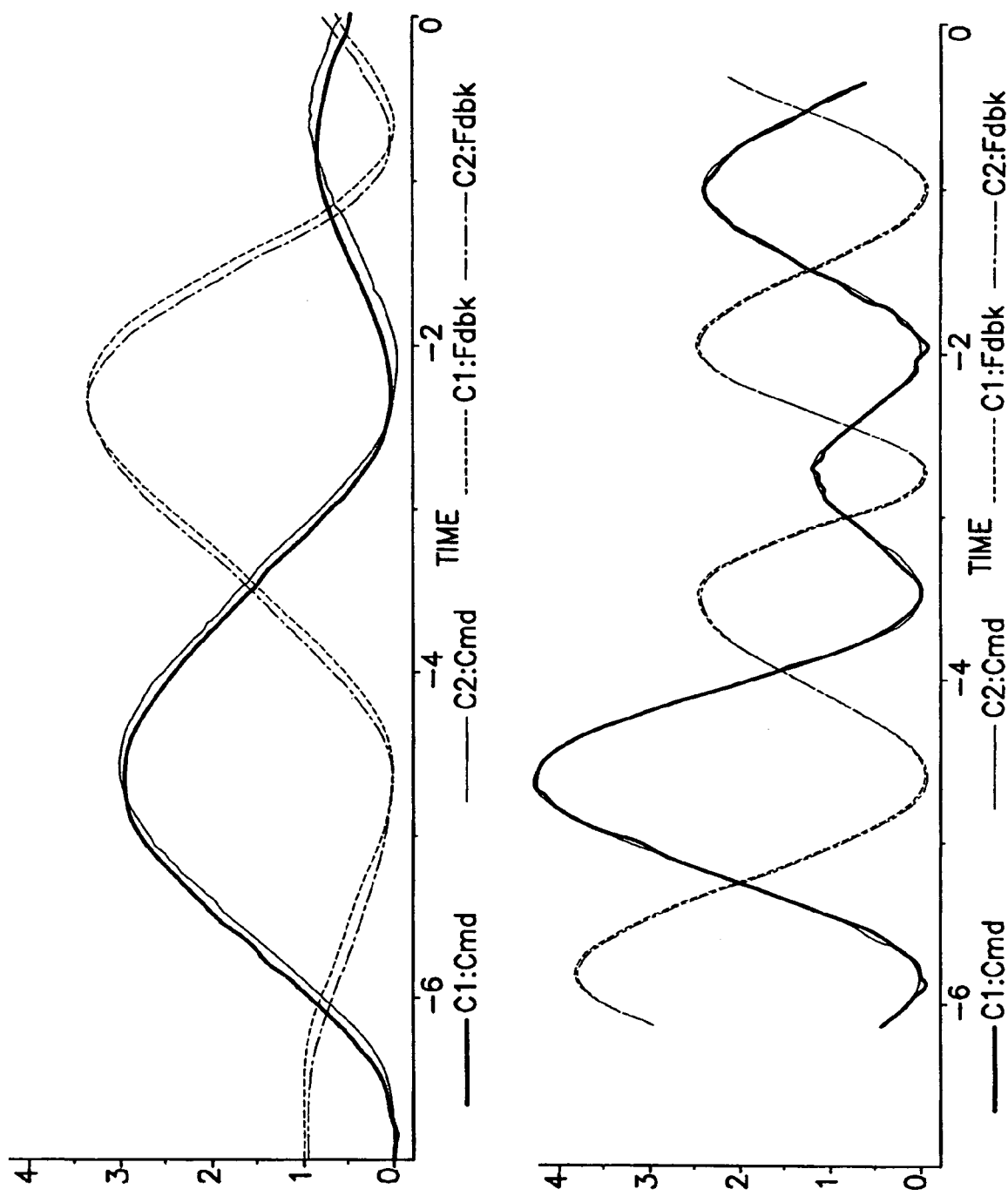

VELOCITY FEEDBACK COMPENSATION FOR FORCE CONTROL SYSTEMS

RELATED APPLICATION

This application is a continuation-in-part of and claims priority from U.S. patent application Ser. No. 11/221,006 filed on Sep. 7, 2005 now U.S. Pat. No. 7,281,431.

TECHNICAL FIELD

The present invention relates generally to force control systems and to vehicle and component testing systems. More particularly, the present invention is related to the accurate controlling of applied force and the direction of that force on a component or system under test. Although this invention is described in terms of linear force and position, it is also directly applicable to angular force (torque) and position (angle).

BACKGROUND

Vehicle systems and components are tested during the development and manufacturing thereof using various techniques. The systems and components undergo static, quasi-static, and dynamic testing to meet and exceed various durability, lifespan, and performance requirements. The testing techniques are used to simulate a working environment and to assure that the systems and/or components under test can survive and perform as desired within that environment.

In performing such tests various actuators are utilized. The actuators apply force on the systems and or components under test. It is desirable that the applied force be accurately controlled. It is also desirable that the actuators, when appropriate, be capable of following the motion of a device without imposing uncharacteristic forces or in effect restricting the motion of that device. For example, when testing an airfoil or wing of an aircraft, tens to hundreds of actuators may be coupled to both sides of that wing. The actuators must work in unison to flex the structure and cause accelerated fatigue. Some tests require high cycle rates, which can be difficult to follow due to changing dynamics experienced by the actuators. As an example, when the wing is being flexed in an upward direction, the actuators coupled to the topside of that wing ought to follow the motion and velocity of that wing without uncharacteristically restricting its movement while the bottom side actuators are applying force in an upward direction. In other words, the non-acting or force-imposing actuators should not impose forces on the wing that would not normally be experienced in a normal operating environment.

Dynamic load control involves the accurate application of compressive and tensile forces to a moving object. When this load is applied using hydraulic actuators and servo valves with classical control methods, the resulting accuracy is typically unacceptable at maximum rated pressures and flows. There is inaccuracy in the applied force relative to the commanded force signals due to motion of the object. This inaccuracy is affected to such a degree that the motion of the object must be drastically reduced to obtain the desired force control accuracy.

Force control systems can also experience lack in symmetry in system polarity. This is especially true when utilizing single ended actuators, in which the amount of lack in symmetry is significant. The lack of symmetry can be due to differences in tubing connections, servo valves, and other components and devices.

Many force control systems, such as lag-lead type, lead-lag type, and pole-zero placement type systems, tend to increase system loop gain in order to reduce steady state error and thus compensate for the motion of the tested object. However, the increased gain only marginally reduces the error and leads to limit cycling or oscillation and instability in the force control loop. Even with the increased gain, these types of force control systems are not robust when null shifts occur in the equipment. Null shifts cause a proportionate amount of force errors to accumulate. Thus, these systems are partially uncontrolled systems and are only marginally stable and as error increases the systems become unstable and are sensitive to null shifts in the hardware.

Another method used to increase system robustness and reduce steady state error is error integration, which is successful in slower systems that do not have backlash and other non-linearities due to mechanical linkages. Backlash can be introduced from, for example, pin-slop. Although useful for static conditions, error integration can cause instability during transitions in force polarity. The integration process increases the settling time required for the actuator to apply an accurate load. This added time constraint reduces the benefit of using integral compensation on durability tests that have fast changing set point commands.

Yet another method used to reduce steady state error is referred to as damping derived from the force signal. This method tends to be slow, which results in larger errors for longer time intervals. The errors are larger due to the increased time for the damping algorithm to correct for the velocity.

Thus, there exists a need for an improved force control system and technique of applying controlled forces on an object under test without the steady state errors, increased settling time, and other associated disadvantages.

SUMMARY

The inventive concepts disclosed herein are applicable to force and position control systems where the object (that has the force applied to it) has motion relative to some inertial frame of reference. This frame of reference may be the same as that of the force control system. The problem to be solved is the inaccuracy of the applied force relative to its command signal due to the motion of the test object. This problem is solved through the use of velocity compensation techniques. Such techniques are also referred to as "velocity feed-forward" and "velocity feed-forward compensation", but will be referred to herein as "velocity compensation". The velocity of interest is the velocity of the test object at the point of actuation.

In addition, when the force application means is hydraulic fluid power that is controlled by a servo valve, there is a loss of force command accuracy associated with the available pressure drop for the velocity compensation in the servo valve. This loss of servo valve flow (velocity) capacity due to loss of available pressure across the ports has been called "load droop". This term will be used in the text of this disclosure. With the velocity compensation adjusted correctly, the change in the available pressure may still represent an error of 10 to 50% of the commanded force value. The change in available pressure may be due to droop in the supply pressure to the servo valve as well as by the use of large amounts of available pressure to produce the forces that are commanded.

Included in the inventive concepts disclosed herein are techniques for compensating for the change in available pressure drop across the servo valve. In particular, a method is disclosed to reduce force and position control tracking errors caused by changes in hydraulic pressure at the actuator ports of the hydraulic servo valve. The method may use either the force command signal or the load cell signal in conjunction with a mathematical algorithm to compensate for changes in the flow capacity in the servo valve caused by changes in pressure at its ports. The force command and load cell signals are required for close-loop force control and are readily available in the control system. The mathematical algorithm can be added easily in the closed-loop routine (algorithm). Good performance can be attained using the load cell signal. Alternatively, the algorithm can use the force command signal and attain the same level of performance. Usage of the force command signal produces feed-forward compensation for load droop. The performance of the control loop with proper velocity feed-forward compensation keeps the feedback signal largely in phase with the command. The load droop behavior is predictable and follows the equation disclosed hereinafter.

One aspect of the invention is a system for actuation of a test object comprising: an actuator coupled to the test object; a servo valve coupled to drive the actuator in accordance with servo valve command signals; and a load control system for providing servo valve command signals that control the servo valve, the servo valve command signals being a function of a velocity compensation algorithm and a load droop compensation algorithm.

Another aspect of the invention is a method for actuating a test object comprising the following steps: coupling an actuator to a test object; driving the actuator in accordance with command signals; and providing command signals that are a function of a velocity compensation algorithm and a load droop compensation algorithm.

A further aspect of the invention is a system for actuation of a test object comprising: a fluid actuator coupled to the test object; a fluid control valve coupled to the fluid actuator; a fluid control valve driver coupled to the fluid control valve; a load control system for providing command signals to the fluid control valve, the command signals being a function of a velocity compensation algorithm and a load droop compensation algorithm, wherein the load droop compensation algorithm determines a load droop compensation factor that is a function of a predicted stall capacity of the fluid actuator.

Other aspects of the invention are disclosed and claimed below.

BRIEF DESCRIPTION OF THE DRAWINGS

FIG. 5A is a front perspective view of a sample velocity transducer assembly disclosed in the parent application;

FIG. 5B is a back perspective view of the velocity transducer assembly of FIG. 5A;

FIG. 13 is a front view of a velocity compensation interface disclosed in the parent application;

FIGS. 17A and 17B are graphs showing the phase shift of a hydraulic actuator when the velocity feed-forward (VFF) compensation technique disclosed herein is ON and OFF, respectively;

DETAILED DESCRIPTION

Figure 1:
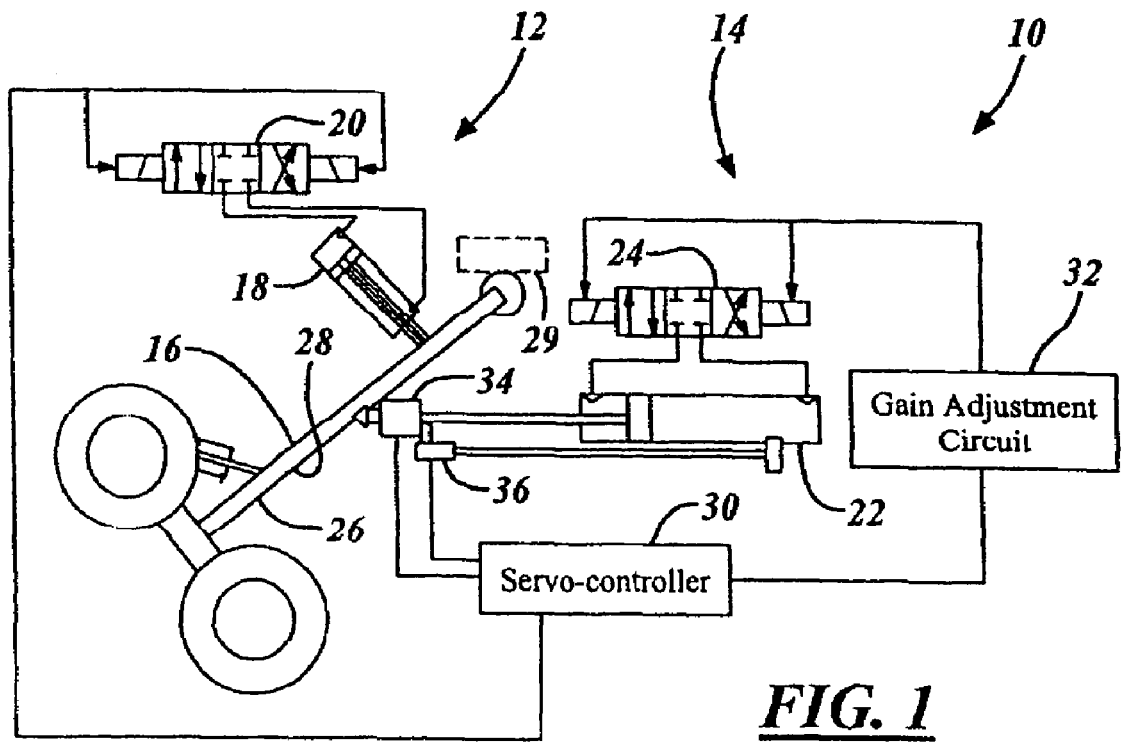
FIG. 1 is a block diagrammatic and schematic view of a portion of a force control system disclosed in the parent application.

In each of the following figures, the same reference numerals are used to refer to the same components. While the present invention is described with respect to systems and methods of applying a controlled force on a test object, the present invention may be adapted for various applications and systems including: aeronautical systems, land-based vehicle systems, or other applications or systems known in the art that require servicing of a vehicle. The present invention is applicable to force control systems where the object in which a force is applied has motion relative to some inertial frame of reference. This reference may be the same as that of the force control system. The present invention also applies to static and dynamic testing applications. The load droop and velocity compensation also works on position-controlled actuators.

In the following description, various operating parameters and components are described for one constructed embodiment. These specific parameters and components are included as examples and are not meant to be limiting. Also, various systems and components are described that may be implemented in hardware and/or software.

Referring now to FIG. 1, a block diagrammatic and schematic view of a portion of a force control system 10 is shown. The force control system 10, for the exemplary embodiment shown, includes a deployment system 12 and an actuation system 14. The deployment system 12 includes a test object 16, a first force and/or position control actuator 18, and a first servo valve or solenoid valve 20. The actuation system 14 includes a second force actuator 22 and a second servo valve 24. The first actuator 18 is coupled to a first side 26 of the test object 16 and the second actuator 22 is coupled to a second side 28 of the test object 16. The force control system 10 may include any number of actuators on various sides of the test object 16. The force actuators may be divided up into sets and positioned on various sides and locations of the test object.

The force actuators are utilized to simulate various operating conditions of the test object 16 and/or to perform various durability, performance, lifespan, and other known testing procedures. The force actuators may sometimes be referred to as rams, cylinders, or pistons. In the exemplary embodiment shown, the first actuator 18 is utilized to simulate the deployment and retraction of aircraft landing gear. The second actuator 22 is utilized to simulate the air drag or pressures experienced on the landing gear during landing of an associated aircraft, which in the test lab is represented by a test stand 29. When the actuation system 22 is not present, the test object 16 moves from fully deployed to fully retracted with only the force of gravity on the test object 16 and the deployment system 12. Note that during a test procedure when the simulated force, such as air pressure, is approximately zero, the second actuator 22 ought to follow the motion of the test object 16 without introducing artificial forces that would not normally be experienced.

The test object 16 may be compliant and have multiple force actuation systems acting thereon. In addition, the test object 16 may be fixed in one or more locations and the compliance may allow motion that is significantly independent of any one of the force actuation systems, i.e., there would be motion even though one of the force control systems was removed.

The first actuator 18 and the second actuator 22 are hydraulic and are driven through the use of the first servo valve 20 and the second servo valve 24, respectively. The servo valves 20 and 24 are controlled via a servo-controller 30 or the like. The hydraulic actuators 18 and 22 and valves 20 and 24 are shown for exemplary purposes; of course, other actuators and control devices may be utilized. A gain adjustment circuit 32 is coupled between the controller 30 and the second valve 22.

A force transducer or load compensation sensor 34 is coupled between the test object 16 and the second actuator 22. A velocity compensation sensor 36 is coupled to the second actuator 22 and the load sensor 34 and detects velocity of the test object 16. The controller 30 adjusts the speed and position of the actuators 18 and 22 in response to signals received from the load sensor 34 and the velocity sensor 36. The components and devices of the force control system 10 are described in further detail below with respect to the embodiments of FIGS. 2-13. The force control system 10 is applicable to both linear and rotary force applied force systems.

Figure 2:
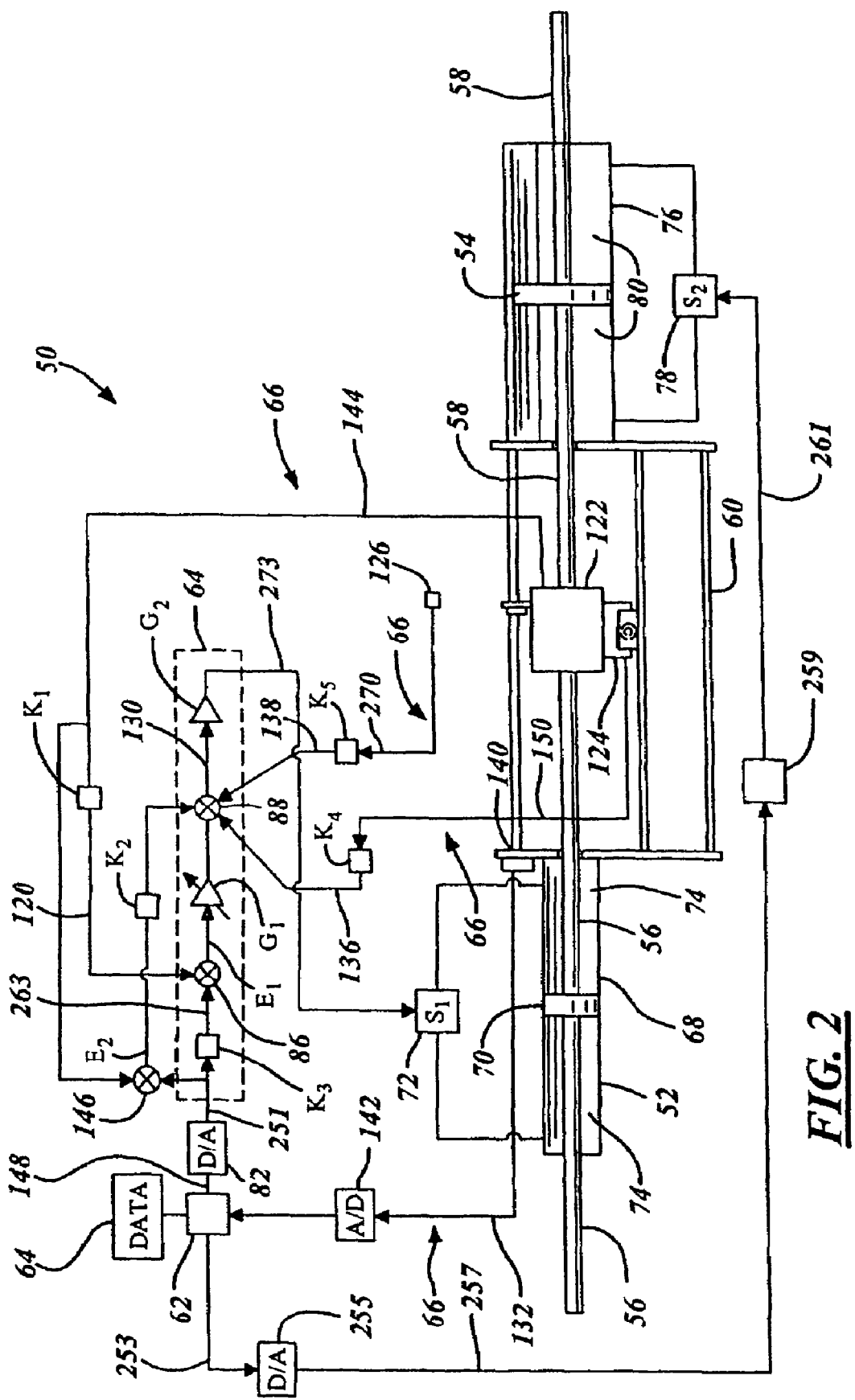
FIG. 2 is a block diagrammatic and schematic view of the force control system disclosed in the parent application.

Referring now to FIG. 2, a block diagrammatic and schematic view of a force control system 50 is shown. The force control system 50 includes one or more force actuators and one or more test objects. In the exemplary setup shown, a single force actuator 52 and a single test object 54 are shown. The force actuator 52 and the test object 54 are coupled to each other via an actuator shaft 56 and a test object shaft 58. The force actuator 52 and the test object 54 are held on a test stand 60. A controller 62 is coupled to the force actuator 52 and the test object 54 and controls the static and dynamic force applied on and the position of the test object 54. The control system 10 also includes one or more gain adjustment circuits 64 (only one is shown) and multiple feedback sensor configurations 66.

The force actuator 52 may be of various types and styles. A sample hydraulic force actuator is shown. The hydraulic actuator 52 includes an actuator housing 68 and an actuator piston 70 disposed therein. The position and the rate of change in position of the actuator piston 70 is adjusted by the controller 62 via a first servo valve 72. Operation of the valve 72 controls the flow of hydraulic fluid to and from fore and aft sides 74 of the actuator piston 70 within the actuator housing 68.

The test object 54 may be of various types and styles. A test object 54 may, for example, be an airfoil, a door, a body panel, or other test object known in the art. A sample test object is shown. The test object shown is in the form of a hydraulic piston, hereinafter referred to as an "object piston", that is located within an object housing 76. The force applied on the object piston 54 is based on a force applied from the actuator 52. The position and rate of change in position of the object piston 54 is adjusted by the controller 62 via the second servo valve 78. Operation of the second valve 78 controls the flow of hydraulic fluid to and from fore and aft sides 80 of the object piston 54 within the object housing 76.

The controller 62 may be microprocessor based such as a computer having a central processing unit, memory (RAM and/or ROM), and associated input and output buses. The controller 62 may be an application-specific integrated circuit or may be formed of other logic devices known in the art. The controller 62 may be a portion of a central control unit, or an interactive vehicle dynamics module, or may be combined into a single integrated controller, or may be a stand-alone controller as shown.

The controller 62 may include or be coupled to a memory 64, as shown. The memory 64 may have stored testing data and related information for performing a predetermined test. The controller 62 may have tables, parameter relationships, and other tools needed to accurately control and perform a given test.

The gain adjustment circuit 64 is coupled to the controller 62 via a digital to analog (D/A) converter 82. The gain adjustment circuit 64 includes an integration circuit $K_3$, a first summing junction 86, a first gain block $G_1$, a second summing junction 88, and a second gain block or actuator servo driver $G_2$, which are coupled in series as stated.

Figure 3:
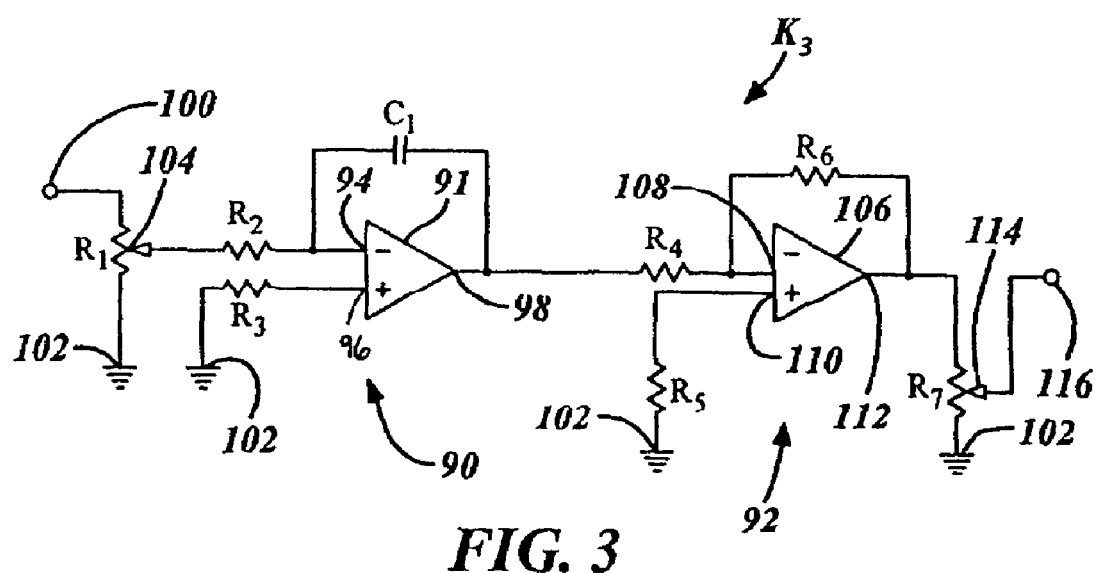
FIG. 3 is a schematic diagram of an integration circuit disclosed in the parent application.

Referring now to FIG. 3, a schematic diagram of the integration circuit $K_3$ is shown. The integration circuit $K_3$ includes an integration stage 90 and an amplification stage 92. The integration stage 90 includes a first operational amplifier 91 having an inverting input 94, a non-inverting input 96, and an output 98. The input 100 of the integration circuit $K_3$ and of the integration stage 90 is coupled to a first resistor $R_1$, which is in turn coupled to a ground 102. The first resistor $R_1$ may be a variable resistor as shown. The wiper terminal 104 of the variable resistor $R_1$ is coupled to the inverting input 94 via a second resistor $R_2$. A third resistor $R_3$ is coupled between the non-inverting input 96 and ground 102. A first capacitor $C_1$ is coupled across the first amplifier 91 between the inverting input 94 and the first amplifier output 98.

The amplification stage 92 includes a second operational amplifier 106 that has an inverting input 108, a non-inverting input 110, and an output 112. A fourth resistor $R_4$ is coupled to the output 112 of the integration stage 92 and to the inverting input 108. A fifth resistor $R_5$ is coupled between the non-inverting input 110 and ground 102. A sixth resistor $R_6$ is coupled across the second amplifier 106 between the inverting input 108 and the second amplifier output 112. A seventh resistor $R_7$, which is shown as a variable resistor, is coupled between the second amplifier output 112 and ground 102. The wiper terminal 114 of the seventh resistor $R_7$, in the exemplary embodiment shown, is also the output 116 of the amplification stage 92 and the integration circuit $K_3$.

The first summing junction 86 sums a feedback signal 120 received from a load sensor 122 with the output 116 to generate a first error signal $E_1$. The gain block GI adjusts amplification of the first error signal $E_1$. The second summing junction 88 sums feedback signals from a velocity sensor 124 and an acceleration sensor 126 and a second error signal $E_2$ to generate a desired applied force signal 130. The velocity sensor 124 may be considered a velocity signal generator. The actuator servo driver $G_2$ adjusts the gain of the desired applied force signal 130.

The feedback sensor configurations 66 generate a position compensation signal 132, the load compensation signal 120, a velocity compensation signal 136, and an acceleration compensation signal 138. The position feedback 132 includes a test object position sensor 140 that is coupled to the test object, which in continuing from the above example is the object piston 54. The position signal 132 is feedback to the controller 62 through an analog-to-digital (A/D) converter 142.

The load sensor 122 is coupled between the force actuator 52 and the object piston 54. The load signal 144 generated from the load sensor 122 is feedback to the gain adjustment circuit 64. The load signal 144 is feedback to an amplification block $K_1$ and subsequently to the first summing junction 86. The amplification block K1 includes amplification and balancing adjustment circuitry. The load signal 144 is also feedback to a third summing junction 146, where it is summed with a load or force command signal 148 to form the true error signal $E_2$. The true error signal $E_2$ passes through a second amplification block $K_2$ prior to being received by the second summing block 88.

Figure 4:
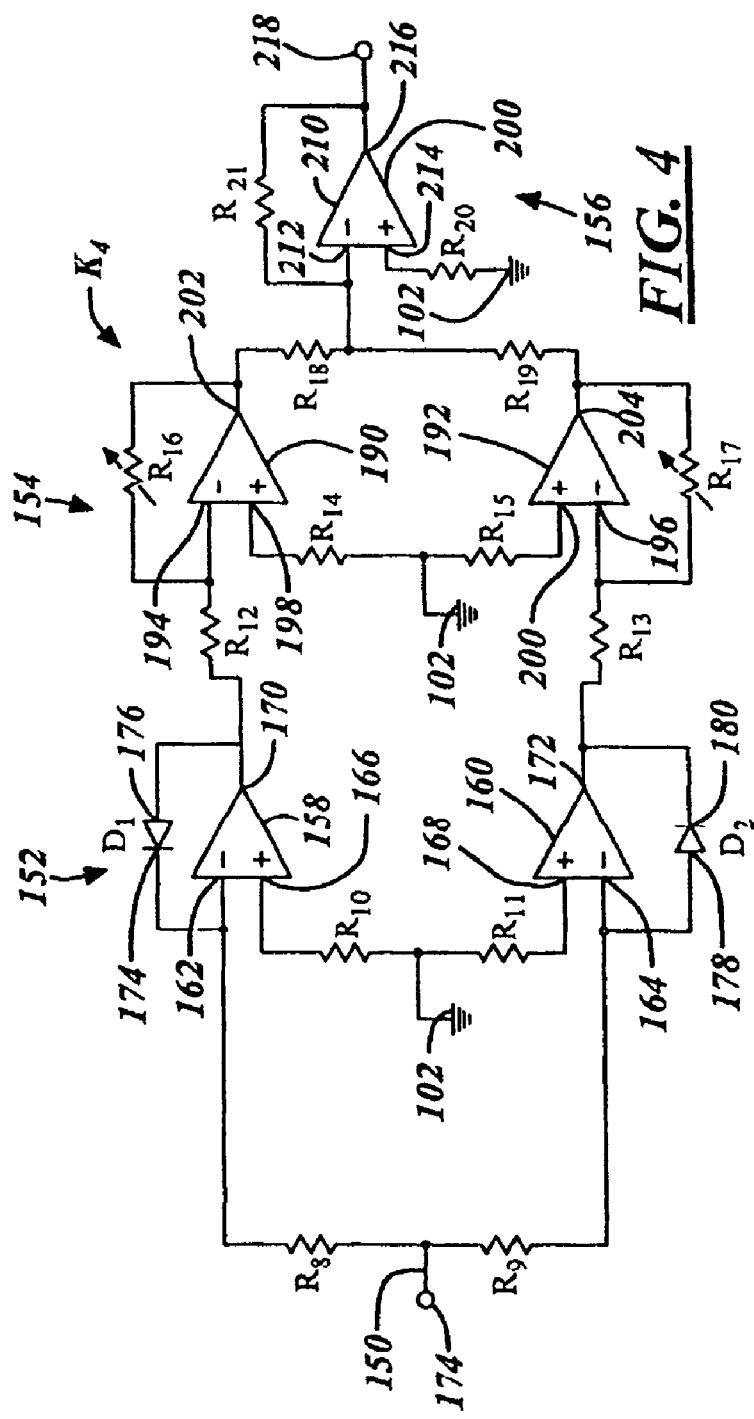
FIG. 4 is a schematic diagram of a velocity gain adjustment circuit disclosed in the parent application.

Referring to FIG. 4, a schematic diagram of the velocity gain adjustment circuit $K_4$ is shown. The velocity signal 150 generated by the velocity sensor 124 is feedback to the second summing block 88 through a velocity-conditioning block $K_4$. The velocity-conditioning block $K_4$ includes a rectification stage 152, an inversion stage 154, and a combining stage 156. The rectification stage 152 includes a third operational amplifier 158 and a fourth operational amplifier 160, which have inverting inputs 162, 164, non-inverting inputs 166, 168, and outputs 170, 172, respectively. The velocity signal 150 enters the conditioning block input 174 and is separated into positive and negative components, which are rectified. The input 174 is coupled to the resistors $R_8$ and $R_9$. The resistor $R_8$ is coupled to the inverting input 162. The resistor $R_9$ is coupled to the inverting input 164. The non-inverting inputs 166, 168 are coupled to resistors $R_{10}$ and $R_{11}$, respectively, which in turn are coupled to ground 102. A first diode $D_1$ having a cathode terminal 174 and an anode terminal 176 is coupled across the third amplifier 158. The cathode terminal 174 is coupled to the inverting terminal 162. The anode terminal 176 is coupled to the third output 170. A second diode $D_2$ that has a second anode terminal 178 and a second cathode terminal 180 is coupled across the fourth amplifier 160. The second anode terminal 178 is coupled to the inverting input 164 and the second cathode terminal 180 is coupled to the fourth output 172.

The inversion stage 154 includes a fifth operational amplifier 190 and a sixth operational amplifier 192, which have inverting inputs 194, 196, non-inverting inputs 198, 200 and outputs 202, 204, respectively. Resistor $R_{12}$ is coupled between the third output 170 and the inverting input 194. Resistor $R_{13}$ is coupled between the fourth output 172 and the inverting input 196. Resistors $R_{14}$ and $R_{15}$ are coupled between the non-inverting inputs 194, 196, respectively, and ground 102. The variable resistor $R_{16}$ is coupled across the fifth amplifier 190 between the inverting input 194 and the fifth output 202. The variable resistor $R_{17}$ is coupled across the sixth amplifier 192 between the inverting input 196 and the sixth output 204.

The combining stage 156 includes a seventh operational amplifier 210 having an inverting input 212, a non-inverting input 214, and an output 216. Resistor $R_{18}$ is coupled between the fifth output 202 and the inverting input 212. Resistor $R_{19}$ is coupled between the sixth output 204 and the inverting input 212. Resistor $R_{20}$ is coupled between the non-inverting input 214 and ground 102. Resistor $R_{21}$ is coupled across the seventh amplifier 200 between the inverting input 212 and the seventh output or the output 218 of the velocity-conditioning block $K_4$, which may be referred to as a polarity compensator.

The acceleration signal 220 generated by the acceleration sensor 126 is feedback to the second summing junction 88 through an acceleration-conditioning block $K_5$. The acceleration-conditioning block K5 includes excitation, amplification, and balance adjustment circuitry known in the art that is commonly utilized with respect to acceleration sensors.

The load sensor 122, velocity sensor 124, acceleration sensor 126, and position sensor 140 may be of various types and styles known in the art. Some examples of load sensors are load cells, strain gages, piezoresistive sensors, and other known force sensors. Some examples of velocity sensors are Hall effect sensors, digital optical sensors, pitot tube arrays, position sensors that provide actual velocity information and time differentiated position sensors. Some examples of acceleration sensors are accelerometers, infrared sensors, laser sensors, and ultrasonic sensors. Some examples of position sensors are infrared sensors, linear and rotary potentiometers, incremental and absolute digital optical sensors, ultrasonic sensors, photogrammetry and magnetic sensors.

Referring to FIGS. 5A and 5B, front and back perspective views of a sample velocity transducer assembly 230 are shown. The velocity transducer assembly 230 may be used in place of the velocity sensor 124. The velocity transducer assembly 230 includes a fixed backing member 232 that is mounted on a base 234. A transducer housing 236 is coupled to the backing member 232 and to the base 234. A transducer 238 is disposed within the housing 236 and may be coupled to the test object shaft 58 via a rotatable wheel 240. The transducer 238 has an output that is proportional to velocity and is rated in volts per revolutions per minute. The wheel 240 is utilized to convert linear motion into rotational motion. Of course, other coupling methods between the transducer 238 and the object piston 54 may be utilized.

The housing 236 is coupled on each side thereof to a bearing 242, which is secured by a threaded step shaft 244. The bearing 242 allows the wheel 240 to pivot up and down to accommodate irregularities in the surface on which it rolls. A spring 246 is incorporated between the backing member 232 and the housing 236 to maintain contact between the wheel 240 and the object piston 54. The spring 246 provides the proper amount of contact force. A damper 248, which may be fluidic, is coupled between the backing member 232 and the housing 236 and prevents the velocity transducer 238 from oscillating.

Figure 6:
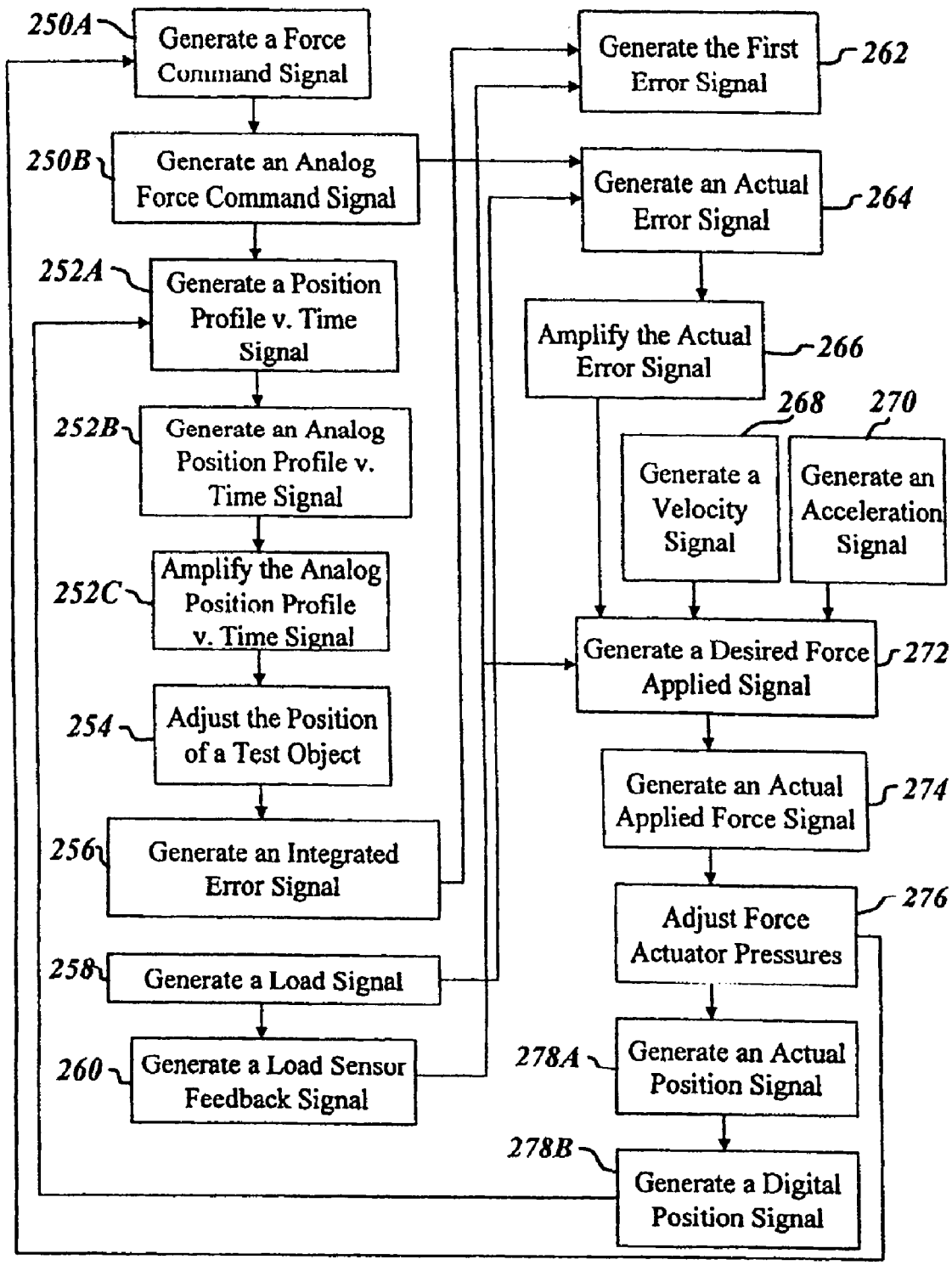
FIG. 6 is a logic control diagram illustrating a method of operating a force control system disclosed in the parent application.

Referring now to FIG. 6, a logic control diagram illustrating a method of operating a force control system and/or of applying a force on a test object is shown. Although the following steps 250-278 are described primarily with respect to the embodiment of FIG. 2, the steps and associated method may be applied to other embodiments.

In step 250A, the controller 62 generates a force command signal 148 in response to the actual position signal 132, generated in step 278 below. In step 250B, the first D/A converter 82 converts the force command signal 148 into an analog force command signal 251.

In step 252A, the controller 62 generates a position profile versus time signal 253. The position profile signal 253 may be in the form of a velocity signal. In step 252B, the second D/A converter 255 converts the position profile signal 253 into an analog position profile signal 257. In step 252C, the analog position profile signal 257 is amplified via the valve amplifier 259 to form an amplified position profile signal 261. In step 254, the position of the test object is adjusted in response to the amplified position profile signal 261.

In step 256, the analog command signal 251 is received by a gain adjustment circuit and is passed to the integration circuit $K_3$. The integration circuit $K_3$ adjusts the gain of the analog command signal 251 and generates an integrated error signal 263.

In step 258, the load sensor 122 generates the load signal 144. In step 260, the load signal 144 is amplified by the amplification block $K_1$ to form the load sensor feedback signal 120. In step 262, the integrated error signal 263 is summed with the load sensor feedback signal 120 to generate the first error signal $E_1$. In step 264, the load signal 144 is summed with the analog command signal 251 to form the true or actual error signal $E_2$. In step 266, the actual error signal $E_2$ is amplified by the amplification block $K_2$.

In step 268, the velocity sensor 124 generates the velocity signal. In step 270, the acceleration sensor 126 generates the acceleration signal.

In step 272, the first error signal E1 is amplified by the gain block $G_1$ and is summed with the velocity compensation signal 136, the acceleration compensation signal 138, and the actual error signal $E_2$ to form the desired applied force signal 130. In step 274, the gain of the desired applied force signal 130 is adjusted by the second gain block $G_2$ to form the actual applied force signal 273. In step 276, the actuator valve 72 receives the actual applied force signal 273 and adjusts pressures within the force actuator 52 in response thereto.

In step 278A, the position sensor 140 generates the actual position signal 132 indicative of the position of the object piston 54. In step 278B, the position signal 132 is converted to a digital signal.

Steps 250-278 are continuously repeated until the end of a test procedure. The above-described steps are meant to be illustrative examples; the steps may be performed sequentially, synchronously, simultaneously, or in a different order depending upon the application.

Figure 7:
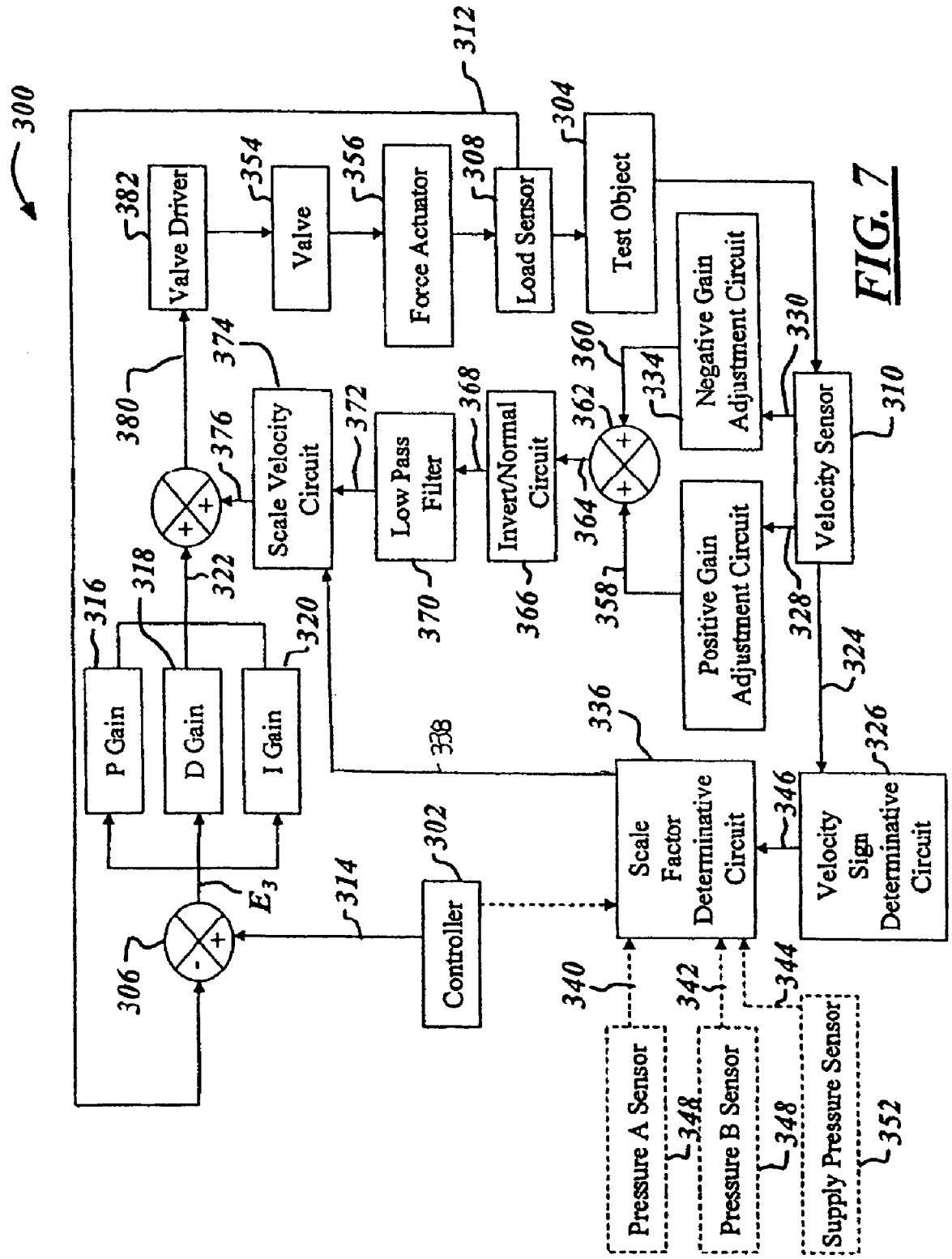
FIG. 7 is a block diagrammatic and schematic view of a force control system disclosed in the parent application.

Referring now to FIG. 7, a block diagrammatic and schematic view of a force control system 300 in accordance with another embodiment is shown. The force control system 300 includes a controller 302 and a test object 304. The controller 302 is similar to the controller 62 and is coupled to a fourth summing junction 306. The test object 304 is coupled to a load sensor 308 and a velocity sensor 310. The load sensor 308 is also coupled to the fourth junction 306. A load signal 312 from the load sensor 308 is subtracted from a force command signal 314 from the controller 302 via the fourth junction 306 to form an error signal $E_3$. The error signal $E_3$ is gain adjusted via a proportional gain adjustment circuit 316, a derivative gain adjustment circuit 318, and an integral gain adjustment circuit 320 to form a modified command signal 322.

The velocity sensor 310 generates a velocity signal 324 that is sent to a velocity sign determinative circuit 326 and is separated into a positive portion 328 and a negative portion 330. The portions 328 and 330 are adjusted via a positive gain adjustment circuit 332 and a negative gain adjustment circuit 334, respectively. The velocity sensor 310 may have a velocity signal offset adjustment (not shown). The velocity compensation is applied to compensate for the polarity, amplitude, and offset of the velocity signal.

When a force actuator of a force control system is driven using hydraulic fluid power and is controlled via a servo valve, as described herein, there may be a loss of force command accuracy. The loss is associated with fluctuations in the available supply pressure, or supply pressure drops, for the velocity compensation in the servo valve. Pressure inaccuracies may also result from the use of large amounts of available pressure to produce the forces that are commanded. Thus, there may be a need to correct for the change in the pressure available for velocity compensation in the servo valve.

Output from the sign determinative circuit 326 is passed to a scale factor determinative circuit 336. The scale factor determinative circuit 336 generates a pressure scale factor 338 in response to force actuator pressures 340 and 342, supply pressure 344, and the sign of the velocity signal 346. The pressure scale factor 338 is described in further detail below with respect to Eq. (5).

The force actuator pressures 340 and 342 and the supply pressure 344 may be generated via a port A pressure sensor 348, a port B pressure sensor 350, and an input pressure sensor 352, or may be calculated by the controller 302. The controller 302 may have stored data relating commanded forces for a given application, fuel control system specifications, fluid circuit specifications, valve specifications, force actuator specifications, as well as other specifications to pressures within and supplied to the valve 354 and force actuator 356.

The gain-adjusted positive and negative portions 358 and 360 of the velocity signal are summed via a fifth summing junction 362 to form a combined signal 364. The gain adjustment of the positive and negative portions 358 and 360 provides the proper velocity compensation value and enables the velocity compensation for the inherent lack of symmetry from single ended actuators and other sources.

The combined signal 364 is inverted by an invert/normal circuit 366, since there is no standard predefined polarity for the velocity. The inverted signal 368 is then filtered through a low pass filter 370. The low pass filter 370 may be set just below the natural frequency of the force control system 300 to reduce the tendency for oscillation due to the velocity input. The filtered signal 372 is scaled using a scale velocity circuit 374. The scaling circuit 374 scales the filtered signal 372 by the pressure scale factor 338 determined above. The force control system 300 may also have the ability to enable and disable the velocity compensation and/or the pressure compensation.

Note that the scaled filtered signal 376 is feedback into the control loop following the proportional, integral, and derivative gain adjustments. This prevents the effect of the gain adjustments on the velocity compensation.

With simple or traditional closed loop control, when the error is zero, the output of the controller is zero. Since a typical servo valve is closed at zero input, there has to be error for the valve to be open. The larger the velocity, the more error is developed to open the valve. This problem can be overcome by biasing the servo valve open, in an amount that is proportional to the velocity. Thus, the valve can be open without introducing error into the force control loop, to allow for the movement of the test object.

The use of the filter limits instability due to the addition of the velocity compensation. The filter is adjustable and is specific to the velocity compensation.

The scaled filtered signal 376 is summed with the modified command signal 322 via a sixth summing junction 378 to form a desired applied force signal 380. The desired applied force signal is conditioned for valve control via a valve driver 382.

The following FIGS. 8-13 provide a further detailed explanation for the reasoning for velocity and pressure compensation.

Figure 8:
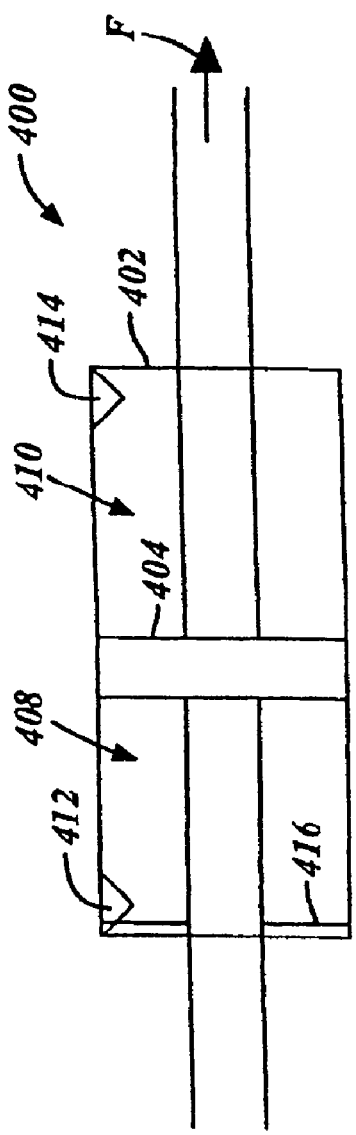
FIG. 8 is a side cross-sectional view of a force actuator disclosed in the parent application.

Referring now to FIG. 8, a side cross-sectional view of a force actuator 400 in accordance with another embodiment is shown. The force actuator 400 includes a housing 402 with a piston 404 disposed and translational therein on a shaft 406. The housing 402 is divided internally by the piston 404 to form a first side 408 and a second side 410. The first side 408 and the second side 410 have a first port 412 and a second port 414, respectively, having pressures $P_A$ and $P_B$. A predetermined or incremental amount of fluid 416 is added into the force actuator 400 on the first side 408. Force F generated by the addition of the fluid 416 is equal to the pressure P in the first side 408 multiplied by the cross-sectional area A of the piston 404. Equation (1) provides the pressure P, where $\beta_e$ is the effective bulk modulus, V is the volume on the first side 408, and Q is the fluid flow rate.

$$P = \frac{\beta_e}{V} \int Q dt \qquad (1)$$

When the associated test object has compliance and moves, the incremental quantity of fluid injected into the actuator 400 may be increased until the stiffness of the test object balances the desired force output by the actuator 400.

Figure 9:
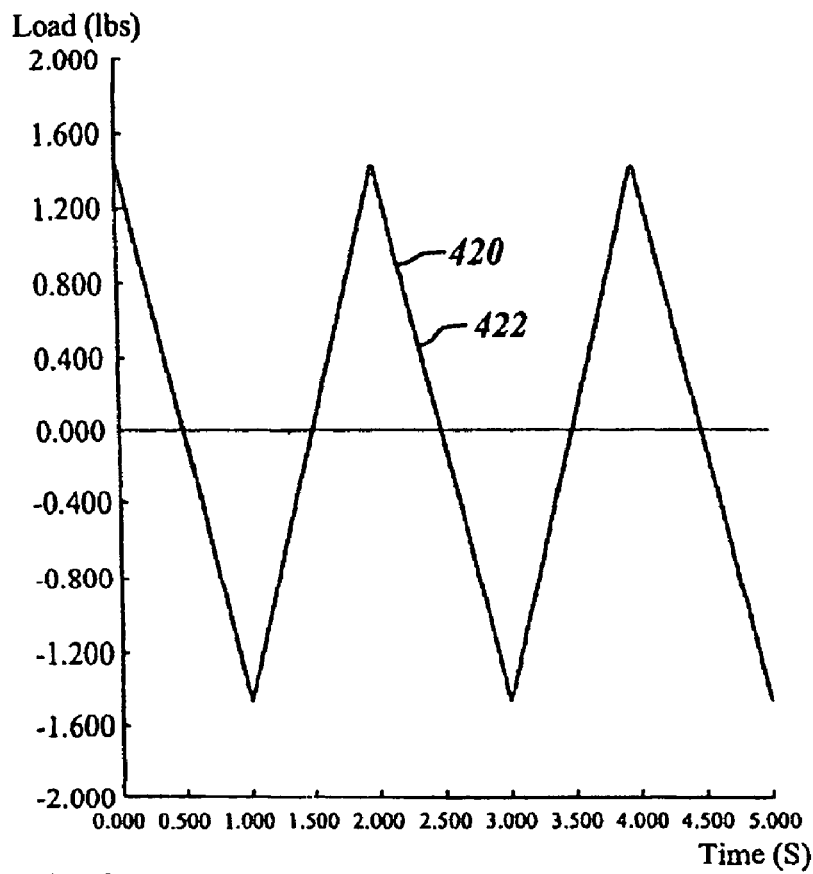
FIG. 9 is a sample plot of a force on a stationary object.

Referring now to FIG. 9, a sample plot of a force on a stationary object is shown. A triangular force profile is shown for a test object having a small amount of compliance. Although in FIG. 9 it appears that a single curve is shown, in actuality two curves are present: a force command curve 420 and an actual force curve 422. The error between the force command curve 420 and the actual force curve 422 is so small that the curves appear as one.

Figure 10:
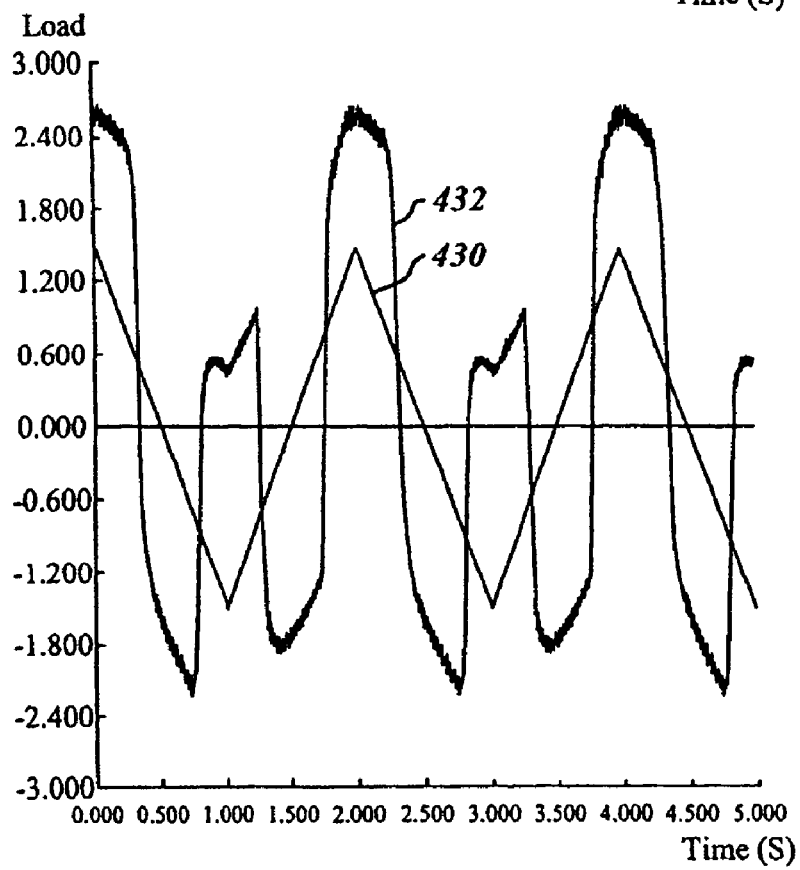
FIG. 10 is a sample plot comparing a force command signal with an actual force on an object in motion.

Referring now to FIG. 10, a sample plot comparing a force command signal 430 with an actual force signal 432 on an object in motion is shown. When the object that the force is applied on is moving, Eq. (1) is no longer adequate. The object is set in an oscillatory motion. Notice that the actual force signal 432 does not follow the force command signal 430. Equations (2) and (3) also need to be satisfied in order for the control system to follow the velocity of the object.

$$Q = A * Vel \qquad (2)$$

$$Q = K_V i \qquad (3)$$

Vel is the velocity of the object, which is proportional to the valve electrical current if the desired force remains constant. The velocity is proportional or directly related to the valve current. This proportionality is linear when the programmed force is constant. $K_V$ is the valve constant and i is the valve current. Equations (2) and (3) satisfy the flow rate required for the actuator to match the velocity of the object with no net force. When Eqs. (2) and (3) are both satisfied, the actuator is following the motion of the object without applying force on the object.

Figure 11:
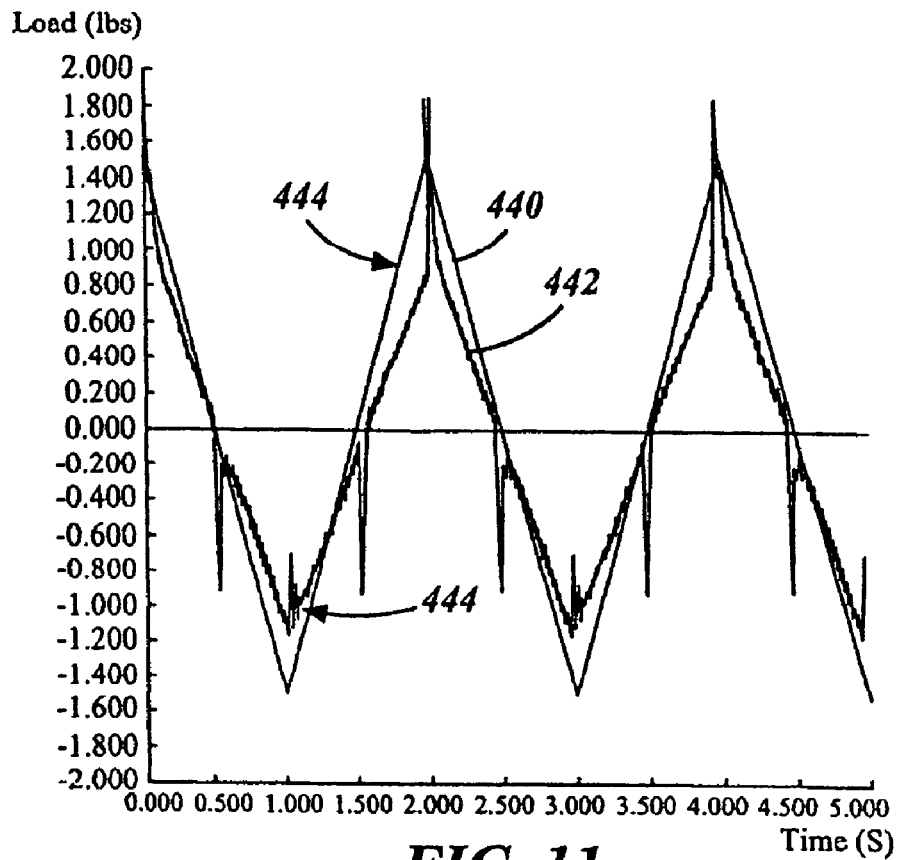
FIG. 11 is a sample plot comparing a force command signal with an actual force on a test object in motion using velocity compensation in accordance with an embodiment disclosed in the parent application.

Referring now to FIG. 11, a plot comparing a force command signal 440 with an actual force signal 442 on a test object in motion using velocity compensation in accordance with another embodiment is shown. The actual force signal 442 follows the force command signal 440 much closer than that of FIG. 10 when velocity compensation is not used. Notice that the actual force has "drooping" areas 444 in comparison to the force command signal 440. The drooping areas are due to the force that is being created. The pressure available to provide the velocity compensation is decreased. Thus, pressure compensation or force correction is used to overcome this drooping effect.

Equations (2) and (3) provide the velocity compensation that is used when there is a constant specified pressure drop across the actuator valve. When this pressure drop varies, the current to produce the flow rate varies with the square root of the pressure drop. This is derived from the orifice Eq. (4), which is a nonlinear function of the pressure drop across the orifice of the actuator valve.

$$Q = C_d A_d \sqrt{\frac{2}{\rho}(P_S - P_R)} \qquad (4)$$

$C_d$ is the discharge coefficient, $A_d$ is the area of the orifice, $P_S$ is the supply pressure, and $P_R$ is the return pressure. $P_R$ is equal to the absolute value of the first port pressure $P_A$ minus the second port pressure $P_B$. $\rho$ is the density of the fluid 416.

For simplicity return pressure $P_R$ may be assumed to be zero. The pressure scale factor is introduced for the amount the velocity compensation current $i_1$, which is set with zero force from the actuator, i.e., the first port pressure $P_A$ is equal to the second port pressure $P_B$, is to be scaled to compensate for the force and the available pressure. The resultant current is referred to as current $i_2$, as shown in Eq. (5), where $\sqrt{P_1}/\sqrt{P_2}$ is the pressure scale factor, $P_1$ is equal to the supply pressure available at zero load when the velocity compensation is adjusted, and $P_2$ is shown by Eq. (6):

$$i_2 = i_1 * \frac{\sqrt{P_1}}{\sqrt{P_2}} \qquad (5)$$

$$P_2 = P_S - |P_A - P_B| * (\text{sign of the velocity}) \qquad (6)$$

There are four states in dynamic load control of an object with independent motion. States 1 and 2 refer to when the force applied is aiding the velocity compensation. In states 1 and 2 the velocity compensation is directed in the opposite direction as the force or $P_2 = P_S + |P_A - P_B|$. State 1 refers to when the velocity compensation is positive and the force is negative, in other words, $P_A < P_B$ and $P_{Avail} = P_A - P_B$, which is negative. State 2 refers to when the velocity compensation is negative and the force is positive, in other words, $P_A > P_B$ and $P_{Avail}$ is positive.

States 3 and 4 refer to when the force applied subtracts from the velocity compensation. In states 3 and 4 the velocity compensation is directed in the same direction as the force or $P_2 = P_S - |P_A - P_B|$. State 3 refers to when the force applied and the velocity compensation is positive, in other words, $P_A > P_B$ and $P_{Avail}$ is positive. State 4 refers to when the force applied and the velocity compensation are negative, in other words, $P_A < P_B$ and $P_{Avail}$ is negative.

Figure 12:
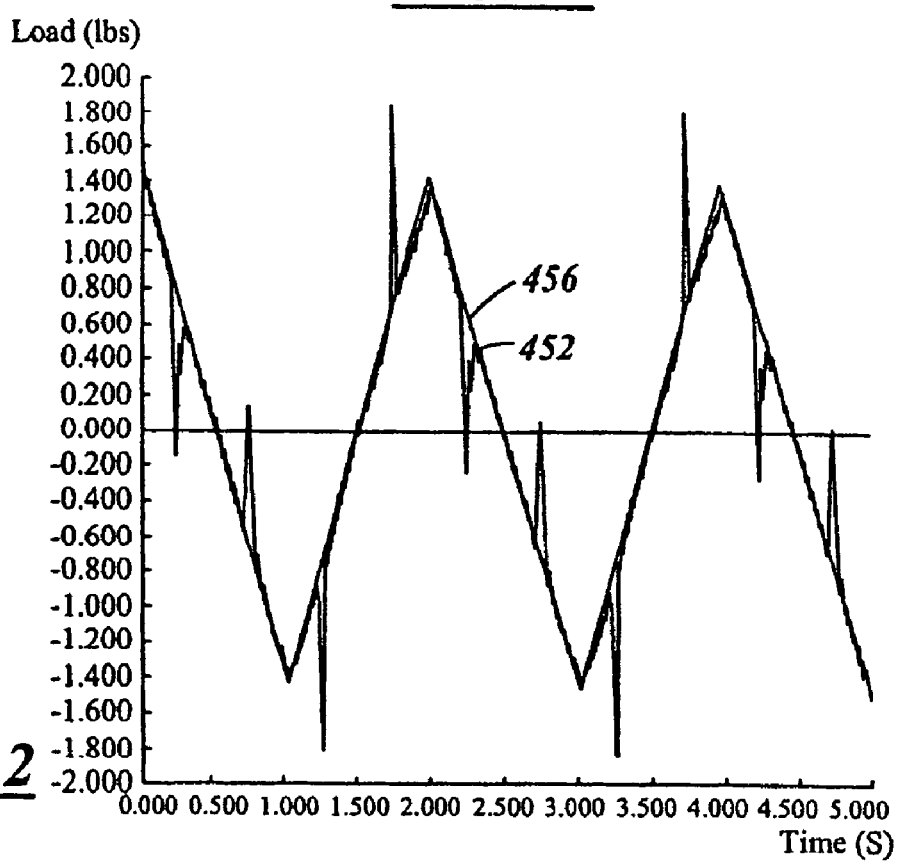
FIG. 12 is a sample plot comparing a force command with an actual force on a test object using velocity and pressure compensation in accordance with an embodiment disclosed in the parent application.

The introduction of the pressure scale factor into the control loop reduces error or eliminates the drooping effect shown in FIG. 11. This is shown in FIG. 12. In FIG. 12, a plot comparing a force command signal 450 with an actual force signal 452 on a test object using velocity and pressure compensation in accordance with another embodiment is shown.

Referring now to FIG. 7 and to FIG. 13, in which a front view of a velocity compensation interface 460 in accordance with another embodiment is shown. A majority of the devices of the force control system 300, shown in FIG. 7, may be implemented in both software and hardware. The software may contain various algorithms for performing the stated and associated tasks. The software may be operated via a controller and have software based inputs with a user interface. The interface 460 shown is an example of a software implementation. The interface 460 includes a filter enablement box 462, a number of poles input 464 for the filter, and a cutoff frequency input 466 for the filter. Positive and negative gain adjustment inputs 468 are also provided. The associated software may determine the sign of the velocity signal and scale the positive and negative portions thereof by the positive and negative gain input values. This software code may take the place of or be used instead of the polarity compensator $K_4$ above.

The interface 460 also includes a delta P scaling section, which has a supply pressure input 470 and a delta P scale factor input 472. The supply pressure input 470 is a constant value. The actual real time supply pressure value may be read by the algorithm, instead of using the constant value 470, and thereby compensate for droop and irregularities in the supply pressure to the load control servo valve. The delta P scale factor 472 is used to adjust the effectiveness of the pressure compensation. The delta P scale factor 472 may be multiplied by the pressure scale factor 338 to increase or reduce the amount of pressure compensation.

The forces applied in moving test objects are often nonlinear functions of another variable, such as landing gear angle. The above-disclosed system, in compensating for the velocity and the acceleration of the test object and the pressures associated with the force actuator valve, applies an accurate force profile to the test object. The velocity compensation results in a more stable system, and this is especially realized when multiple force systems are installed on a single test object. This is because of the loop gain of the force control system, which may be reduced as much as 90%, since it does not have to compensate for the motion of the object and only has to provide closed loop control of the force.

The above-described system also provides a means to apply a force to a moving object when the motion is not a dependent function of the applied force. The system provides an accurate force even when there are fluctuations in supply pressure or a lack of available pressure across a servo valve delivering hydraulic power to the force producing device.

Figure 14:
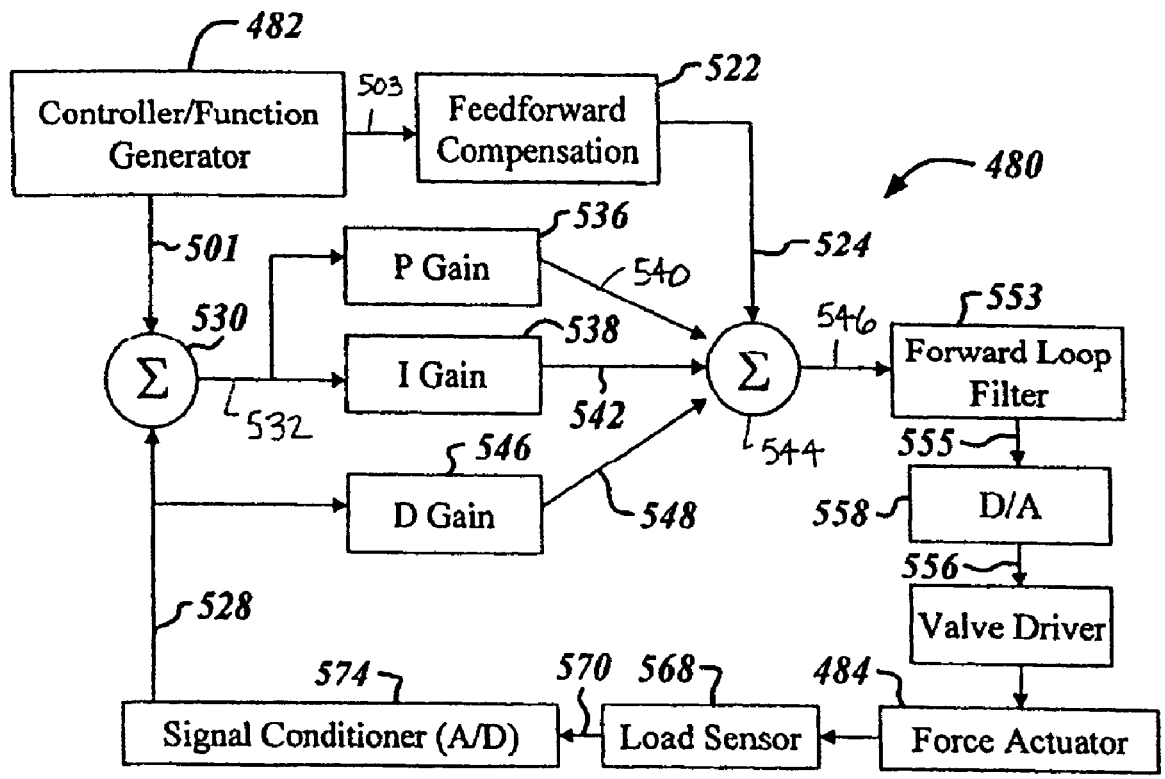
FIG. 14 is a block diagrammatic view of a force control system disclosed in the parent application.
Figure 15:
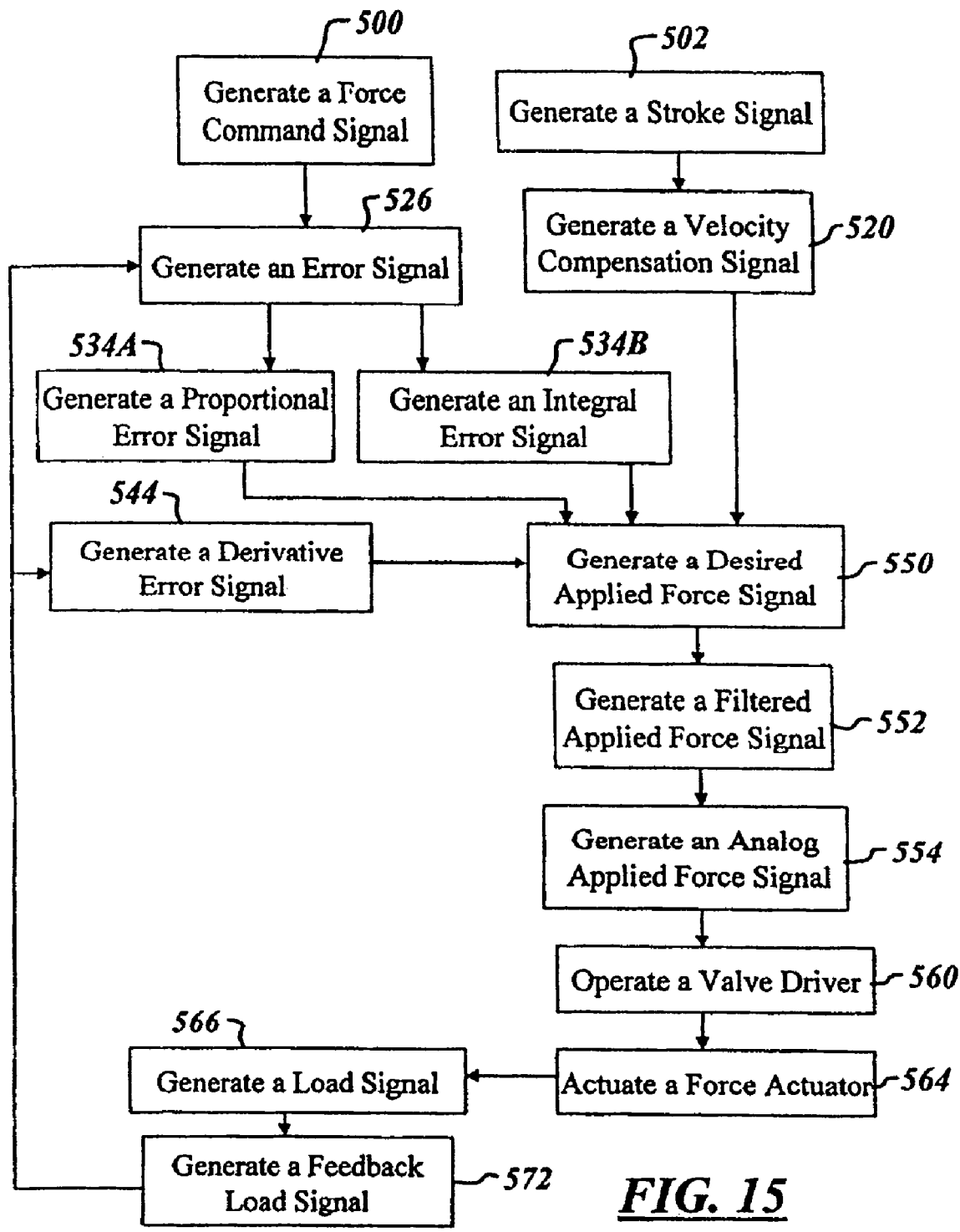
FIG. 15 is a logic control diagram illustrating another method of operating a force control system disclosed in the parent application.

Referring now to FIGS. 14 and 15, a block diagrammatic view of a force control system 480 and a logic control diagram illustrating a method of operating the force control system 480 and/or of applying a force on a test object are shown in accordance with yet another embodiment. Referring to FIG. 14, the force control system 480 includes a controller 482 that performs as a function generator. The controller 482 provides feedforward, as opposed to feedback, velocity compensation to one or more force actuators 484 (only one is shown).

Referring to FIG. 15, in step 500, the controller 482 generates a force command signal 501, similar to the force command signal 314. In step 502, the controller 482 also generates a displacement or stroke signal 503. The controller 482 provides velocity information to each force actuator 484. This eliminates the need for large load errors to drive the actuators. The controller 482 generates the stroke signal 503 such that the actuators are stroked in phase with the motion of the test object. The stroke signal 503 may be used to allow the actuators that are operating in a "follow" mode to displace in phase with the test object without introducing forces on the test object. When multiple actuators are used, the stroke signal 503 is typically not a function of the force command signal 501.

Figure 16:
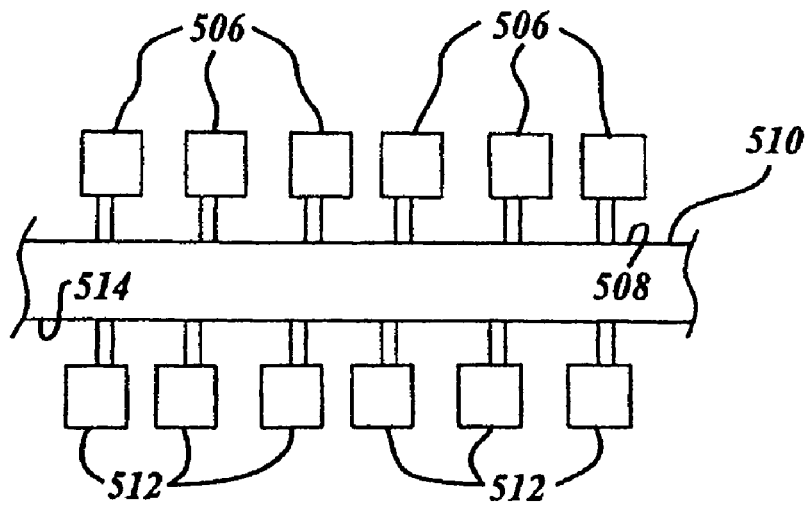
FIG. 16 is a side view of a wing having associated force applying actuators and following actuators performing in accordance with an embodiment disclosed in the parent application.

Referring also to FIG. 16, and as an example, during a wing test, a first set of force actuators 506 may be coupled to a topside 508 of a wing 510. A second set of force actuators 512 may be coupled to a bottom side 514 of the wing 510. The upper actuators 506 may apply force to flex the wing 510 upward and the lower actuators 512 may apply loads to flex the wing 510 downward. The actuators that are not applying a force or that are opposing the wing motion travel along or follow the motion of the wing without loading the wing. In using a stroke signal that is separate from the force command signal, the system 480 (see FIG. 14) is able to stroke the following actuators when the associated force command signal is zero. This overcomes phase lag between the test object and the force actuator.

Returning to FIGS. 14 and 15, in step 520, a feedforward compensation circuit 522, which is coupled to an output of the controller 482, differentiates the stroke signal 503 to achieve a velocity compensation signal 524. In step 526, the force command signal 501 and a feedback load signal 528 are summed via a seventh summing junction 530 to form an error signal 532. In step 534, the error signal 532 is separately gain adjusted via a proportional compensation circuit 536 and an integral compensation circuit 538 to generate a proportional error signal 540 and an integral error signal 542, as represented by steps 534A and 534B. The proportional circuit 536 and the integral circuit 538 are coupled to the controller 482 via the summing junction 530. In step 544, the feedback load signal 528 is gain adjusted via a derivative compensation circuit 546 to generate a derivative load signal 548. In step 550, the velocity compensation signal 524, the proportional error signal 540, the integral error signal 542, and the derivative load signal 548 are summed using a eighth summing junction 544 to generate a desired applied force signal 546. In step 552, the desired applied force signal 546 is filtered using a forward loop filter 553 to generate a filtered applied force signal 555. In step 554, the filtered applied force signal 555 is converted to an analog applied force signal 556 using a D/A converter 558. In step 560, the valve driver 562 operates in response to the analog applied force signal 556. In step 564, the force actuator 484 moves in response to the fluid pressures received from the valve driver 562. In step 566, a load sensor 568 generates a load signal 570 in response to the load on a test device as applied by the force actuator 484. In step 572, the load signal 570 is conditioned and converted into a digital format using a signal conditioner 574 having an A/D converter.

Steps 500-574 are continuously performed until the end of a test procedure. The above-described steps are also meant to be illustrative examples; the steps may be performed sequentially, synchronously, simultaneously, or in a different order depending upon the application.

The above steps may be performed after the running of the system 480 without the use of the velocity compensation to determine the projected velocity. This projected velocity may be utilized to generate the velocity profile used or generated in step 500.

The above control adds an additional signal source, the function generator, to control the motion of the force actuators. This separate source provides piston velocity information to each hydraulic actuator, thus, eliminating the need for large load errors to drive the actuators as in traditional control systems.

A further method for compensating for load droop does not require the use of pressure transducers to measure the pressures at the ports of the servo valve. The method makes use of either the force command or the load cell signal and a formula to compensate for the changes in the flow capacity in the servo valve caused by changes in pressure at its ports. The force command and load cell signals are required for closed-loop force control and are readily available in the control system. A mathematical algorithm is proposed to compensate for changes in available pressure drop across the servo valve. The mathematical algorithm can be added easily in the closed-loop routine (algorithm).

Good performance can be attained using the load cell signal. It matches the performance of compensation using pressure transducers. Alternatively, the algorithm can use the force command signal and attain the same level of performance. Usage of the force command signal produces feed-forward compensation for load droop. The performance of the control loop with proper velocity feed-forward compensation keeps the feedback signal largely in phase with the command signal, as seen in FIG. 17B. (FIG. 17A shows the effect in the absence of velocity feed-forward compensation.) The load droop behavior is predictable and follows the equation disclosed hereinbelow.

The proposed method is based on the following principle. The servo valve modulates four orifices within its body. Each orifice functions as a sharp orifice and follows the orifice equation that relates flow to pressure difference across the orifice:

$$Q = C\sqrt{P} \qquad (7)$$

where Q is the flow, C is the flow/area coefficient and P is the pressure difference. The proposed method uses this formula for the orifices and the relationship between the four orifices in its mathematical model. The model uses a force signal, either command or feedback, as its input and calculates the level of droop expected for the motion of the actuator.

The performance of a servo valve-controlled hydraulic actuator changes with the external force applied to the piston. The actuator will extend or retract at different rates if the force applied to the piston is either tension or compression. For example, say the actuator is commanded to extend. When a tension force is applied to the piston, the piston extends faster, and, conversely, when a compression force is applied, the piston extends slower. The flow model for a hydraulic actuator includes the following four regimes or cases: (i) actuator extending with a tension load; (ii) actuator extending with a compression load; (iii) actuator retracting with a tension load; and (iv) actuator retracting with a compression load. Further evaluation of the four regimes reveals that the regimes can be reduced to two if the piston force (load) variable carries a sign. This is a system convention. Tension load is considered positive and compression load is negative. This convention is usually used within a load control system.

The purpose for modeling the influences of load on the actuator is to make the response of the actuator linear. The model is manipulated into a ratio form so it can be easily embedded into the servo algorithm. Typical compensation levels for this model are as follows:

| Force (% of Stall Capacity) | Compensation Ratio for Extension | Compensation Ratio for Retraction |
| --- | --- | --- |
| −90 (compression) | 3.18 | 0.72 |
| −80 | 2.24 | 0.74 |
| −70 | 1.83 | 0.77 |
| −60 | 1.58 | 0.79 |
| −40 | 1.29 | 0.84 |
| −20 | 1.12 | 0.91 |
| 0 (unloaded) | 1.00 | 1.00 |
| 20 | 0.91 | 1.12 |
| 40 | 0.84 | 1.29 |
| 60 | 0.79 | 1.58 |
| 70 | 0.77 | 1.83 |
| 80 | 0.74 | 2.24 |
| 90 (tension) | 0.72 | 3.18 |

The data in the center column of the table is based on an actuator extending. The negative percent force values indicate a compressive load being applied to the piston rod. Loading in this direction while the actuator is extending tends to slow it down. As the load value is increased, the piston movement is slowed more. The compensation ratio for extension listed in the table shows the relative multiplier required to compensate for the load being applied to the piston rod. At 90% of the compressive stall force, the controller needs to multiply the servo valve command signal by 3.18 to maintain the same velocity as attained at 0 percent (unloaded). For 90% of the compressive stall force applied in tension, the controller needs to attenuate the servo valve command signal by 28% (0.72 on the table) to maintain the "unloaded" extension rate.

The values of the foregoing table were derived using the following formula:

$$\text{Compensation Ratio} = 1/\text{SQRT}(1 + \text{Percent Stall Capacity}/100) \qquad (8)$$

This formula uses the stall capacity of the actuator. For equal-area actuators where the tension and compression areas are the same, the stall capacity is the same for extending and retracting cases. For unequal-area actuators, the stall capacity is defined as the compression area multiplied by the system pressure for the extending case and the tension area multiplied by the system pressure for the retracting case. These two cases are handled by the formula expressed in the next section.

To best illustrate the non-linear behavior of a loaded actuator, a compressively loaded actuator is programmed to extend and then retract. Based on the value for −60%, the servo valve command signal must be multiplied by 1.58 to maintain the unloaded extension rate. When the direction is switched and the actuator is being retracted, the multiplier must immediately change to 0.79 to maintain the same rate of motion. The difference between these factors grows as the load level is increased.

The foregoing model code is embedded into the controller algorithm. The sign of the valve command variable is used to determine whether the actuator is extending or retracting. Using this sensitivity, the model selects the appropriate compensation equation. Both equations use the "load" variable. This variable is set to the current force or load command value. This parameter is being tracked and controlled by the load control system. Its value is usually changed smoothly and continuously. The "load_comp" ratio is calculated by the formulas to provide the appropriate compensation to the valve command signal. The variable "SV" is the fully compensated value that is sent to the servo valve.

Figure 18:
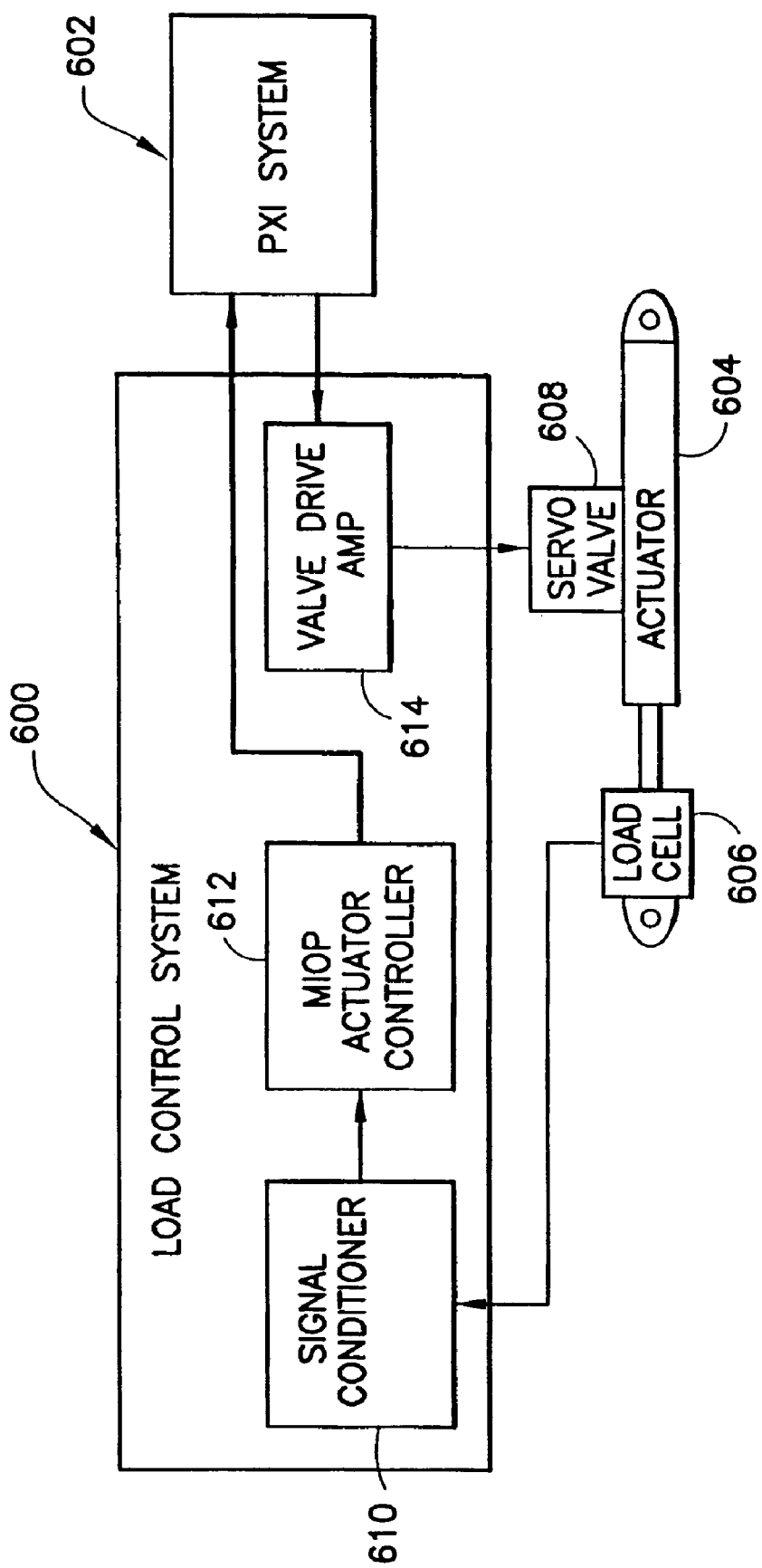
FIG. 18 is a block diagrammatic view of a force control system in accordance with one implementation.

FIG. 18 shows a force control system for driving a double-acting hydraulic actuator 604 in accordance with the foregoing model code. The force control system comprises a load control system 600, such as the Aero-90 load control system commercially available from MTS Systems Corporation, and a PXI system 602 commercially available from National Instruments Corporation. Although not shown in FIG. 18, the hydraulic actuator moves a test object along a reciprocating or cyclical path. The actuator movement is controlled by a servo valve 608 having suitable pressure and return connections.

The load control system 600 comprises a signal conditioner 610, a MIOP (Multiple Input Output Processor) actuator controller 612, and a valve drive amplifier 614. The signal conditioner 610 receives an output from a load cell 606 that is coupled to the hydraulic actuator 604. The conditioned signals are then inputted to the actuator controller 612, which has four channels of control (two inputs each). Inside the controller 612, a control algorithm is triggered continuously by a system clock. The algorithm runs completely each clock tick. This algorithm reads the conditioned feedback signal from the signal conditioner 610, checks limits, computes commands, computes servo loops, and then sends servo valve command signals for controlling the servo valve 608.

In a typical load control system, the servo valve command signals output by controller 612 would be sent directly to a valve drive amplifier 614 coupled to the servo valve 608. In the present implementation, however, the PXI system 602 acquires the servo valve command signals from the actuator controller 612 and passes compensated versions thereof to the valve drive amplifier at a rate of 1,000 updates per second. The PXI system 602 needs to be synchronized with the load control system. The PXI system can apply three types of compensation to the basic signal: (1) velocity feed-forward; (2) area ratio (replaces the compensation available in the MIOP actuator controller 612); and (3) load droop. The processing is done digitally, with the analog inputs being converted to digital signals; the digital results of the compensation processing being then converted to analog signals for output to the valve drive amplifier.

In accordance with one implementation, the PXI system sums a velocity compensation term with the servo valve command from the load control system to arrive at a velocity-compensated servo valve command. If the piston is extending, the velocity-compensated servo valve command is divided by the square root of the area ratio (i.e., the ratio of the area on the compression side of the piston to the area on the tension side of the piston). If the piston retracting, then the velocity-compensated servo valve command is not attenuated to account for the area ratio. In either event, the result is then multiplied by the load compensation ratio set forth in Eq. (8) above to provide load compensation. The resulting servo valve command is then converted to an analog signal and output to a valve drive amplifier.

Figure 19:
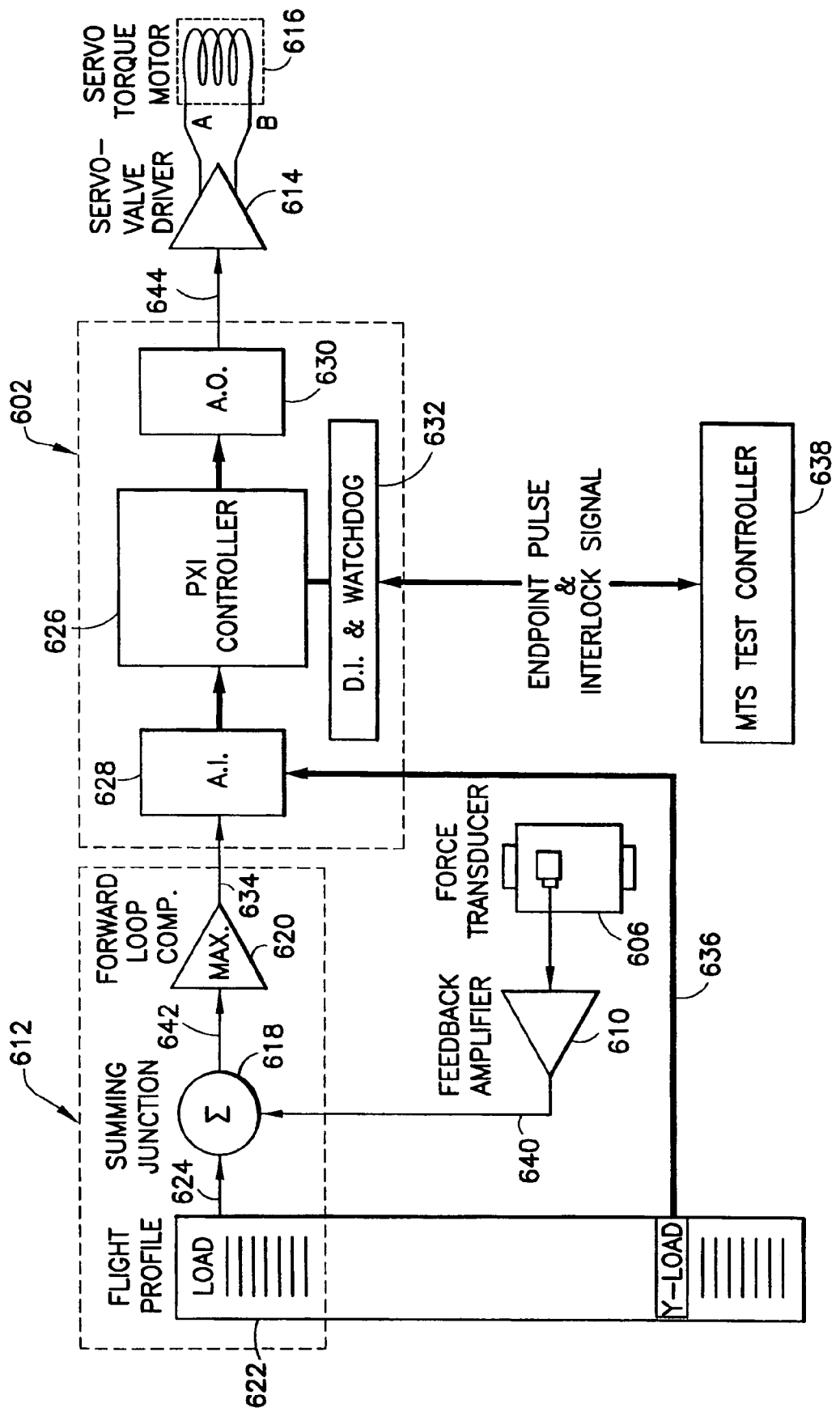
FIG. 19 is a block diagrammatic view showing the force control system of FIG. 18 in greater detail.

Referring now to FIG. 19, the actuator controller 612 comprises a summing junction 618, a forward loop compensation circuit 620 and a flight profile table 622 storing Load, Y-load and displacement or stroke information. The Load information in table 622 is the expected (i.e., predicted) load. The Y-load information in table 622 modulates between fixed limits of +10 to –10 volts. The purpose of the Y-load data is to indicate the percentage of completion of each transition between a peak and a valley of a sinusoidal waveform corresponding to the predicted load.

During testing, the Load information for each controlled actuator 604 is read out of table 622 and transmitted in the form of force command signals 624. For each actuator, a respective force command signal 624, representing the predicted load, is passed to one input of the summing junction 618. At the same time, the signal conditioner 610, e.g., a feedback amplifier, delivers a conditioned load cell signal 640, representing the actual load produced by that same actuator 604, to the other input of the summing junction 618. The feedback permits comparison to determine that the force profile provided in table 622 is being followed by the hydraulic actuator 604. The summing junction 618 outputs an error signal 642 to the forward loop compensator 620, which in turn outputs servo valve command signals 634 to the PXI system 602.

Still referring to FIG. 19, the PXI system 602 comprises a PXI deterministic controller 626 (e.g., an NI PXI-8187, 2.5 GHz, Pentium 4-M Embedded Controller), an analog input 628 (e.g., an NI PXI-6289 18-bit 32-channel Analog Input), an analog output 630 (e.g., an NI PXI-6723 13-bit 32-channel Analog Output), and a digital interface with watchdog timer 632 (e.g., an NI PXI-6528 48-channel digital I/O with watchdog timer). In this implementation, the PXI analog input 628 acquires servo valve command signals from the actuator controller 612, the PXI controller 626 adds compensation as previously described, and the PXI analog output 630 sends the compensated servo valve command signals to each valve driver amplifier 614, which drives the torque motor 616 of an associated servo valve.

The digital interface with watchdog timer 632 communicates with an MTS test controller 638, which is another level in the MTS load control system, operating in the background to monitor how well each channel is doing). The watchdog timer 632 watches over the PXI system. If the PXI system is healthy, the PXI controller 626 will pet the watchdog timer regularly to inhibit it from causing an interlock. If the watchdog timer 632 times out, it trips a relay and causes an interlock signal to be sent to the MTS test controller 638.

The analog input 628 receives the servo valve command signals 634 from the load control system for all actuators being controlled. The analog input 628 also receives signals 636 representing Y-load information read out from the flight profile table 622 for each actuator being controlled. After these analog inputs have been acquired, the PXI controller 626 performs various calculations, including the following: (1) filtering and calculating average Y-load signals to remove spurious noise; (2) calculate velocity compensation for each active channel; (3) calculate unequal actuator performance compensation; (4) calculate transition ratio: (5) calculate actuator load droop compensation; and (6) limit output voltages to ±10 volts to eliminate serious system errors that might stop the processor. Voltages representing the compensated servo valve command signals are then written to the analog output 630.

In accordance with the foregoing implementation, a velocity compensation algorithm determines the stroke between endpoints for each actuator channel and then multiples the stroke by the velocity gain (VG) and changes in the Y-load (YL) signal:

```
/* velocity feed-forward calculation */
stroke = TD – TD_1;
velocity_comp = VG * stroke * abs( YL – YL_1 );
``` where TD is the table displacement. The velocity compensation term velocity_comp is then summed with the MIOP servo valve command signal (analog input (AI) measurement):

```
/* sum VFF compensation with Aero90 valve signal */
valve_cmd = AI + velocity_comp;
```

The valve command is checked for polarity and is attenuated when negative (piston extending condition):

```
/* Compensate for unequal actuator areas */
if ( valve_cmd < 0 )
    valve_cmd = valve_cmd / sqrt ( AR );
``` where AR is the area ratio as previously defined.

In accordance with the foregoing implementation, after velocity compensation and compensation for unequal actuator areas, a load droop linearization algorithm calculates the transition ratio (fraction of transition completed between endpoints) as follows:

```
/* calculate transition fraction */
if ( TYL > 0.01 ) {
    t_ratio = ( YL + Span / 2. )/ Span;
} else {
    t_ratio = 1. - ( YL + Span / 2. ) / Span; }
``` where Span is the amount of change from the maximum to the minimum Y-load; and TYL is a column in the Y-load table that tells whether the Y-load is going to +10 V or −10 V, i.e., the direction of change. Then the algorithm uses the previous and destination load values from the Load table to calculate the current load:

```
/* calculate load from the spectrum load table */
load = TL_1 + ( TL - TL_1 ) * t_ratio;
```

If compensation is off, the algorithm "zeros" the calculated load value:

```
/* activate or deactivate load compensation */
if ( L_C == 0 ) load = 0.;
```

The algorithm then uses the polarity of the servo valve command signal to select the appropriate load linearization formula. The algorithm for determining the compensation ratio and then calculating the load-compensated valve command signal is as follows:

```
/* apply load compensation for given direction */
if ( valve_cmd >= 0 ) {
    load_comp = 1 / sqrt ( 1 - load / ( PS * AT ) );
} else {
    load_comp = 1 / sqrt ( 1 + load / (PS * AC ) ); }
/* calculate valve drive */
SV = valve_cmd * load_comp;
``` where valve_cmd is the valve command signal that the servo controller has calculated/determined for the servo valve; load_comp is a compensation ratio that adjusts the valve command signal supplied to the servo valve; load is the force (predicted) exerted by the piston of the actuator; PS is the pressure (predicted) supplied to the servo valve; AT is the tension area of the actuator; AC is the compression area of the actuator; and SV is the compensated command signal supplied to the servo valve.

The voltage values written to the analog output cards are limited to +10 V for positive voltages and −10 V for negative voltages in order to eliminate system errors that might the processor.

The invention utilizes signals that are readily available inside a conventional servo control system—it does not require additional sensors or parameters. The model is able to produce the load droop compensation based on the force signal. If the user selects the force command signal instead of the force feedback signal, the compensation does not introduce another feedback path within the controller. This makes the compensation predictable while being effective.

The usage of this compensation makes it possible to demand the actuation to track closer to desired specifications. In laboratory testing of aircraft structures and actuation systems, this closer tracking results in faster testing and more accurate testing. Faster testing can reduce the cost of testing as well as earlier detection of fleet retrofit requirements. More accurate testing results in a safer more reliable product.

The above-described systems and methods are capable of being adapted for various applications and use in various systems including: aeronautical systems, land-based vehicle systems, or other applications or systems known in the art that require servicing of a vehicle.

Many modifications and other embodiments will come to mind to one skilled in the art to which this disclosure pertains having the benefit of the teachings presented in the foregoing descriptions and the associated drawings. Therefore, it is to be understood that the appended claims are not to be limited to the specific embodiments disclosed and that modifications and other embodiments are intended to be included within their scope. Although specific terms are employed herein, they are used in a generic and descriptive sense only and not for purposes of limitation.

What is claimed is:

1. A system for actuation of a test object comprising:
an actuator coupled to the test object;
a servo valve coupled to drive said actuator in accordance with servo valve command signals;
a load control system for providing servo valve command signals that control said servo valve, said servo valve command signals being a function of a velocity compensation algorithm and a load droop compensation algorithm.

2. The system as recited in claim 1, wherein said servo valve command signals are also a function of an unequal actuator area compensation algorithm.

3. The system as recited in claim 1, further comprising a valve drive amplifier coupled to said servo valve, said valve drive amplifier receiving said servo command signals from said load control system.

4. The system as recited in claim 1, wherein said load control system comprises an analog servo controller, a multichannel analog-to-digital converter, a digital compensation controller, and a multi-channel digital-to-analog converter.

5. The system as recited in claim 1, wherein said servo valve is coupled to said actuator via a plurality of actuator ports, and said load droop compensation algorithm determines a load droop compensation factor independent of the pressures at said actuator ports.

6. The system as recited in claim 1, wherein said load droop compensation algorithm determines a load droop compensation factor that is a function of a predicted stall capacity of said actuator.

7. The system as recited in claim 1, wherein said load droop compensation factor is a function of a predicted force exerted by a piston of said actuator.

8. The system as recited in claim 7, wherein said load droop compensation factor is also a function of a predicted pressure supplied to said servo valve.

9. The system as recited in claim 8, wherein said load droop compensation factor is also a function of the tension area of said actuator if the polarity of said servo valve command signals is positive.

10. The system as recited in claim 8, wherein said load droop compensation factor is also a function of the compression area of said actuator if the polarity of said servo valve command signals is negative.

11. The system as recited in claim 1, wherein said load control system comprises a servo controller that outputs servo valve command signals without velocity compensation and without load droop compensation, and a compensation controller that outputs servo valve command signals with velocity compensation and load droop compensation, said valve command signals with velocity compensation and load droop compensation outputted by said compensation controller being a function said servo valve command signals without velocity compensation and without load droop compensation outputted by said servo controller.

12. The system as recited in claim 11, wherein said velocity compensation algorithm is performed by said compensation controller and comprises the step of summing a velocity compensation term with a value indicative of a servo valve command signal received from said servo controller to arrive at a velocity-compensated servo valve command.

13. The system as recited in claim 12, wherein said load droop compensation algorithm is performed by said compensation controller and comprises the step of multiplying a value that is a function of said velocity-compensated servo valve command by a load droop compensation factor that is a function of a predicted stall capacity of said actuator.

14. The system as recited in claim 13, wherein said servo valve command signals are also a function of an unequal actuator area compensation algorithm performed by said compensation controller and comprising the step of multiplying said velocity-compensated servo valve command by an unequal actuator area compensation factor that is a function of an area ratio of said actuator to arrive at said value utilized by said load droop compensation algorithm.

15. A method for actuating a test object comprising the following steps:
   coupling a fluid actuator to a test object;
   driving said fluid actuator in accordance with command signals; and
   providing command signals that are a function of a velocity compensation algorithm and a load droop compensation algorithm.

16. The method as recited in claim 15, wherein said command signals are also a function of an unequal actuator area compensation algorithm.

17. The method as recited in claim 15, wherein said load droop compensation algorithm determines a load droop compensation factor that is a function of a predicted stall capacity of said fluid actuator.

18. The method as recited in claim 15, wherein said load droop compensation algorithm determines a load droop compensation factor that is a function of a predicted force exerted by a piston of said fluid actuator.

19. The method as recited in claim 18, further comprising the step of coupling a fluid control valve to said fluid actuator, wherein said load droop compensation factor is also a function of a predicted pressure supplied to said fluid control valve.

20. A system for actuation of a test object comprising:
   a fluid actuator coupled to the test object;
   a fluid control valve coupled to said fluid actuator;
   a fluid control valve driver coupled to said fluid control valve;
   a load control system for providing command signals to said fluid control valve, said command signals being a function of a velocity compensation algorithm and a load droop compensation algorithm,
   wherein said load droop compensation algorithm determines a load droop compensation factor that is a function of a predicted stall capacity of said fluid actuator.

* * * * *